United States Patent [19]
Miller et al.

[11] Patent Number: 5,541,054
[45] Date of Patent: Jul. 30, 1996

[54] SPECTRAL SENSITIZING DYES FOR PHOTOTHERMOGRAPHIC ELEMENTS

[75] Inventors: James R. Miller, Hudson, Wis.; Brian C. Willett, Grant Township, Washington County, Minn.; Doreen C. Lynch, Afton, Minn.; Becky J. Kummeth, Lake Elmo, Minn.

[73] Assignee: Minnesota Mining & Manufacturing Company, St. Paul, Minn.

[21] Appl. No.: 425,860

[22] Filed: Apr. 20, 1995

[51] Int. Cl.$^6$ .............................. G03C 1/498; G03C 1/20
[52] U.S. Cl. ...................... 430/572; 430/584; 430/603; 430/611; 430/617; 430/619
[58] Field of Search .................... 430/594, 619, 430/617, 603, 611, 567, 572

[56] References Cited

U.S. PATENT DOCUMENTS

| | | | |
|---|---|---|---|
| 2,734,900 | 2/1956 | Heseltine . | |
| 4,975,362 | 12/1990 | Parton et al. | 430/584 |
| 5,108,882 | 4/1992 | Parton et al. . | |
| 5,387,502 | 2/1995 | Inagaki | 430/584 |
| 5,393,654 | 2/1995 | Burrows et al. | 430/619 |

FOREIGN PATENT DOCUMENTS

| | | |
|---|---|---|
| 0559228 | 8/1993 | European Pat. Off. . |
| 06003763A | 1/1994 | Japan . |

OTHER PUBLICATIONS

"Redox Limitations for the Spectral Sensitization of Silver Halide in the Infrared" by J. R. Lenhard, et al., J. Phys. Chem., 1993, 97, pp. 8269–8280.

"Cyanine Type Dyes," disclosed by Wayne W. Weber, II, Research Disclosure, Sep., 1978, Item No. 17363, p. 64, including Process of Formation of Color Images, Photographic product and Treatment Solutions Useful for Putting the Process into Practice, Research Disclosure, Sep., 1978, Item No. 17362, p. 66.

Primary Examiner—Thorl Chea
Attorney, Agent, or Firm—Gary L. Griswold; Walter N. Kirn; Mark A. Litman

[57] ABSTRACT

The present invention provides heat-developable, photothermographic elements comprising a support bearing at least one photosensitive, image-forming layer comprising:
(a) a photosensitive silver halide;
(b) a non-photosensitive, reducible silver source;
(c) a reducing agent for silver ions;
(d) a binder; and
(e) a spectrally sensitizing amount of a compound having the central nucleus:

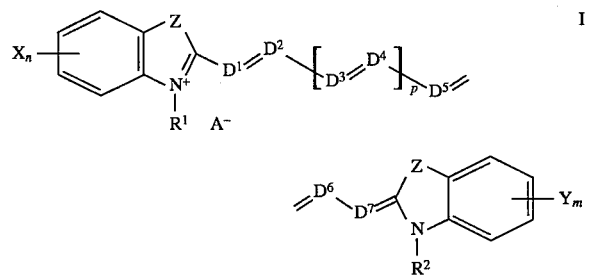

wherein:
Z is S, O, Se or N—$R^3$;
$R^1$ and $R^2$ represent an alkyl group of from 1 to 20 carbon atoms other than carboxy-substituted alkyl, preferably an alkyl group of from 1 to 8 carbon atoms, and most preferably an ethyl group; and
$R^3$ is H or alkyl group;
X and Y are thioalkyl groups of from 1 to 20 carbon atoms;
n=0 to 4;
m=0 to 4; the sum of n plus m equals at least 1;
$D^1$ to $D^7$ each independently represents a methine group and adjacent methine groups selected from $D^2$, $D^3$, $D^4$, $D^5$ and $D^6$ may form cyclic groups;
p=0 or 1; and
$A^-$ is an anion.

36 Claims, No Drawings

SPECTRAL SENSITIZING DYES FOR PHOTOTHERMOGRAPHIC ELEMENTS

BACKGROUND OF THE INVENTION

1. Field of Invention

This invention relates to rigidized and non-rigidized thioalkyl substituted cyanine dyes and their use as spectral sensitizing dyes in photothermographic imaging elements.

2. Background of the Art

Silver halide-containing, photothermographic imaging materials (i.e., heat-developable photographic elements) processed with heat, and without liquid development, have been known in the art for many years. These elements are also known as "dry silver" compositions or emulsions and generally comprise a support having coated thereon: (a) a photosensitive compound that generates silver atoms when irradiated; (b) a non-photosensitive, reducible silver source; (c) a reducing agent (i.e., a developer) for silver ion, for example the silver ion in the non-photosensitive, reducible silver source; and (d) a binder.

The photosensitive compound is generally photographic silver halide which must be in catalytic proximity to the non-photosensitive, reducible silver source. Catalytic proximity requires an intimate physical association of these two materials so that when silver atoms (also known as silver specks, clusters, or nuclei) are generated by irradiation or light exposure of the photographic silver halide, those nuclei are able to catalyze the reduction of the reducible silver source. It has long been understood that silver atoms (Ag°) are a catalyst for the reduction of silver ions, and that the photosensitive silver halide can be placed into catalytic proximity with the non-photosensitive, reducible silver source in a number of different fashions. The silver halide may be made "in situ," for example by adding a halogen-containing source to the reducible silver source to achieve partial metathesis (see, for example, U.S. Pat. No. 3,457,075); or by coprecipitation of silver halide and the reducible silver source (see, for example, U.S. Pat. No. 3,839,049). The silver halide may also be made "ex situ" and added to the organic silver salt. The addition of silver halide grains to photothermographic materials is described in *Research Disclosure*, June 1978, Item No. 17029. It is also reported in the art that when silver halide is made ex situ, one has the possibility of controlling the composition and size of the grains much more precisely, so that one can impart more specific properties to the photothermographic element and can do so much more consistently than with the in situ technique.

The non-photosensitive, reducible silver source is a compound that contains silver ions. Typically, the preferred non-photosensitive reducible silver source is a silver salt of a long chain aliphatic carboxylic acid having from 10 to 30 carbon atoms. The silver salt of behenic acid or mixtures of acids of similar molecular weight are generally used. Salts of other organic acids or other organic compounds, such as silver imidazolates, have been proposed. U.S. Pat. No. 4,260,677 discloses the use of complexes of inorganic or organic silver salts as non-photosensitive, reducible silver sources.

In both photographic and photothermographic emulsions, exposure of the photographic silver halide to light produces small clusters of silver atoms (Ag°). The imagewise distribution of these clusters is known in the art as a latent image. This latent image is generally not visible by ordinary means. Thus, the photosensitive emulsion must be further processed to produce a visible image. This is accomplished by the reduction of silver ions which are in catalytic proximity to silver halide grains bearing the clusters of silver atoms, (i.e., the latent image). This produces a black and white image. In photographic elements, the silver halide is reduced to form the black-and-white image. In photothermographic elements, the light-insensitive silver source is reduced to form the visible black-and-white image while much of the silver halide remains as silver halide and is not reduced.

In photothemographic elements the reducing agent for the organic silver salt, often referred to as a "developer," may be any compound, preferably any organic compound, that can reduce silver ion to metallic silver. At elevated temperatures, in the presence of the latent image, the non-photosensitive reducible silver source (e.g., silver behenate) is reduced by the reducing agent for silver ion. This produces a negative black-and-white image of elemental silver.

While conventional photographic developers such as methyl gallate, hydroquinone, substituted-hydroquinones, catechol, pyrogallol, ascorbic acid, and ascorbic acid derivatives are useful, they tend to result in very reactive photothermographic formulations and fog during preparation and coating of photothermographic elements. As a result, hindered phenol developers (i.e., reducing agents) have traditionally been preferred.

As the visible image in black-and-white photothermographic elements is usually produced entirely by elemental silver (Ag°), one cannot readily decrease the amount of silver in the emulsion without reducing the maximum image density. However, reduction of the amount of silver is often desirable to reduce the cost of raw materials used in the emulsion and/or to enhance performance. For example, toning agents may be incorporated to improve the color of the silver image of the photothermographic elements as described in U.S. Pat. Nos. 3,846,136; 3,994,732; and 4,021,249.

Another method of increasing the maximum image density in photographic and photothermographic emulsions without increasing the amount of silver in the emulsion layer is by incorporating dye-foraging or dye-releasing compounds in the emulsion. Upon imaging, the dye-forming or dye-releasing compound is oxidized, and a dye and a reduced silver image are simultaneously foraged in the exposed region. In this way, a dye-enhanced black-and-white silver image can be produced. Dye enhanced black-and-white silver image forming elements and processes are described in U.S. Pat. No. 5,185,231.

The imaging arts have long recognized that the field of photothermography is clearly distinct from that of photography. Photothermographic elements differ significantly from conventional silver halide photographic elements which require wet-processing.

In photothermographic imaging elements, a visible image is created by heat as a result of the reaction of a developer incorporated within the element. Heat is essential for development and temperatures of over 100° C. are routinely required. In contrast, conventional wet-processed photographic imaging elements require processing in aqueous processing baths to provide a visible image (e.g., developing and fixing baths) and development is usually performed at a more moderate temperature (e.g., 30°–50° C.).

In photothermographic elements only a small amount of silver halide is used to capture light and a different form of silver (e.g., silver behenate) is used to generate the image with heat. Thus, the silver halide serves as a catalyst for the development of the non-photosensitive, reducible silver source. In contrast, conventional wet-processed black-and-white photographic elements use only one form of silver (e.g., silver halide) which, upon development, is itself converted to the silver image. Additionally, photothermographic elements require an amount of silver halide per unit area that is as little as one-hundredth of that used in conventional wet-processed silver halide.

Photothermographic systems employ a light-insensitive silver salt, such as silver behenate, which participates with the developer in developing the latent image. In contrast, photographic systems do not employ a light-insensitive silver salt directly in the image-forming process. As a result, the image in photothermographic elements is produced primarily by reduction of the light-insensitive silver source (silver behenate) while the image in photographic black-and-white elements is produced primarily by the silver halide.

In photothermographic elements, all of the "chemistry" of the system is incorporated within the element itself. For example, photothermographic elements incorporate a developer (i.e., a reducing agent for the non-photosensitive reducible source of silver) within the element while conventional photographic elements do not. The incorporation of the developer into photothermographic elements can lead to increased formation of "fog" upon coating of photothermographic emulsions. Even in so-called instant photography, the developer chemistry is physically separated from the photosensitive silver halide until development is desired. Much effort has gone into the preparation and manufacture of photothermographic elements to minimize formation of fog upon coating, storage, and post-processing aging.

Similarly, in photothermographic elements, the unexposed silver halide inherently remains after development and the element must be stabilized against further development. In contrast, the silver halide is removed from photographic elements after development to prevent further imaging (i.e., the fixing step).

In photothermographic elements the binder is capable of wide variation and a number of binders are useful in preparing these elements. In contrast, photographic elements are limited almost exclusively to hydrophilic colloidal binders such as gelatin.

Because photothermographic elements require thermal processing, they pose different considerations and present distinctly different problems in manufacture and use. In addition, the effects of additives (e.g., stabilizers, antifoggants, speed enhancers, sensitizers, supersensitizers, etc.) which are intended to have a direct effect upon the imaging process can vary depending upon whether they have been incorporated in a photothermographic element or incorporated in a photographic element.

Because of these and other differences, additives which have one effect in conventional silver halide photography may behave quite differently in photothermographic elements where the underlying chemistry is so much more complex. For example, it is not uncommon for an antifoggant for a silver halide system to produce various types of fog when incorporated into photothermographic elements.

Distinctions between photothermographic and photographic elements are described in *Imaging Processes and Materials (Neblette's Eighth Edition)*; J. Sturge et al. Ed; Van Nostrand Reinhold: New York, 1989; Chapter 9 and in *Unconventional Imaging Processes;* E. Brinckman et al, Ed; The Focal Press: London and New York: 1978; pp. 74–75.

Many cyanine and related dyes are well known for their ability to impart spectral sensitivity to a gelatino silver halide element. The wavelength of peak sensitivity is a function of the dye's wavelength of peak light absorbance. While many such dyes provide some spectral sensitization in photothermographic formulations, the dye sensitization is often very inefficient and it is not possible to translate the performance of a dye in gelatino silver halide elements to photothermographic elements. The emulsion making procedures and chemical environment of photothermographic elements are very harsh compared to those of gelatino silver halide elements. The presence of large surface areas of fatty acids and fatty acid salts restricts the surface deposition of sensitizing dyes onto silver halide surfaces and may remove sensitizing dye from the surface of the silver halide grains. The large variations in pressure, temperature, pH and solvency encountered in the preparation of photothermographic formulation aggravate the problem. Thus sensitizing dyes which perform well in gelatino silver halide elements are often inefficient in photothermographic formulations. In general, it has been found that merocyanine dyes are superior to cyanine dyes in photothermographic formulations as disclosed, for example, in British Patent No 1,325,312 and U.S. Pat. No. 3,719,495.

Attempts to sensitize at the far red end of spectrum have produced somewhat variable results. In particular, the use of cyanine dyes to impart sensitivity in photothermographic elements in the far red and near infrared has given results quite inconsistent with the performance of such dyes in conventional gelatino silver halide elements. The art therefore leads the skilled technician towards modifying merocyanines to attain desired performance levels. There are however very few merocyanines capable of absorbing at more than 750 nm and also there is uncertainty as to whether dyes which absorb at such wavelengths will also sensitize photothermographic elements.

The recent commercial availability of relatively high powered semiconductor light sources, and particularly laser diodes which emit in the red and near-infrared region of the electromagnetic spectrum, as sources for output of electronically stored image data onto photosensitive film or paper is becoming increasingly widespread. This has led to a need for high quality imaging articles which are sensitive in the near infrared region and has created a need to sensitize photothermographic elements to match such exposure sources. In particular, it is necessary to match sources emitting in the wavelength range from 780 to 850 nm, which is towards the extreme end of sensitizing dye art. Such articles find particular utility in laser scanning.

Although spectral sensitizing dyes for photothermographic elements are now known which absorb in the 780–850 nm wavelength range, dyes which have improved shelf-life stability, sensitivity, contrast and low Dmin are still needed for photothermography.

U.S. Pat. Nos. 5,108,662 and 4,975,221; and J. R. Lenhard et al., *J. Phys. Chem.* 1993, 97, 8269–8280 describe photographic elements which are spectrally sensitized to the infrared with heptamethine spectral sensitizing dyes of various structures. Both of these patents show heptamethine dyes which may include at least one thioalkyl group (e.g., thiomethyl) substituted on one of the aromatic rings in the dye molecule structure. Typically, one or more thiomethyl substituents is present on the 5-position of the fused phenyl rings on the dyes. Neither patent specifically mentions photothermographic elements, but both reference U.S. Pat. No. 4,619,892 which describes multilayer infrared sensitive photographic elements and also mentions color photothermographic multilayer infrared sensitive elements.

British Patent No. 425,417 discloses photographic elements spectrally sensitized with carbocyanine dyes, including benzothiazole heptamethine dyes substituted with various groups, including alkoxy and thioalkyl (e.g., dyes 6 and 7 of B.P. 425,417). These dyes are disclosed for use in photographic systems.

SUMMARY OF THE INVENTION

The present invention provides heat-developable, photothermographic elements which are capable of providing high photospeed; stable, high density images of high resolution and good sharpness.

The heat developable, photothermographic element comprises a support bearing at least one photosensitive, image-forming layer comprising:
(a) a photosensitive silver halide;
(b) a non-photosensitive, reducible silver source;
(c) a reducing agent for silver ions;
(d) a binder; and
(e) a spectrally sensitizing amount of a compound having the central nucleus:

$$X_n \underset{R^1}{\overset{Z}{\diagup}} D^1 = D^2 \diagdown [D^3 = D^4]_p \diagdown D^5 = D^6 \diagdown D^7 \underset{R^2}{\overset{Z}{\diagup}} Y_m \quad \text{A}^- \qquad \text{I}$$

wherein:
Z is S, O, Se or N—$R^3$;

$R^1$ and $R^2$ represent an alkyl group of from 1 to 20 carbon atoms other than carboxy-substituted alkyl; preferably an alkyl group of from 1 to 8 carbon atoms, and most preferably an ethyl group;
$R^3$ is H or alkyl group (preferably of 1 to 4 carbon atoms, most preferably methyl or ethyl);
X and Y are thioalkyl groups of from 1 to 20 carbon atoms;
n=0 to 4;
m=0 to 4;
the sum of m plus n equals at least 1, preferably 1, 2, 3, or 4;
$D^1$ to $D^7$ each independently represents a methine group and adjacent methine groups selected from $D^2$, $D^3$, $D^4$, $D^5$ and $D^6$ may form cyclic groups;
p=0 or 1; and
$A^-$ is an anion.

Preferably, the spectrally sensitizing compound has the central nucleus:

$$X_n \underset{R^1}{\overset{S}{\diagup}} D^1 = D^2 \diagdown D^3 = D^4 \diagdown D^5 = D^6 \diagdown D^7 \underset{R^2}{\overset{S}{\diagup}} X_n \quad \text{A}^- \qquad \text{II}$$

wherein:
X is independently a thioalkyl group of from 1 to 20 carbon atoms;
n is independently 0, 1 or 2 with the total of all n's being at least 1, and preferably 1, 2, 3, or 4;
$R^1$ and $R^2$ represent an alkyl group of from 1 to 20 carbon atoms other than carboxy-substituted alkyl; preferably an alkyl group of from 1 to 8 carbon atoms, and most preferably an ethyl group; and $A^-$ is an anion. Any anion is useful with conventional anions used in dye chemistry, such as, but not limited to, I, Br, Cl, $ClO_4$, paratoluenesulfonate, PECHS, acid anions, solubility affecting anions (e.g., perfluorinated alkylsulfonyl methides and amides), and the like as known in the art.

Most preferably the spectrally sensitizing compound has the central nucleus:

$$(X)_n \underset{R^2}{\overset{S}{\diagup}} N^+ = \text{CH} - \text{(octahydronaphthalene)} - \text{CH} = \underset{R^1}{\overset{S}{\diagup}} N (X)_n \quad \text{A}^- \qquad \text{III}$$

wherein:
X is independently a thioalkyl group of from 1 to 20 carbon atoms;
n is independently 0, 1 or 2 with the total of all n's being at least 1;
$R^1$ and $R^2$ represent an alkyl group of from 1 to 20 carbon atoms other than carboxy-substituted alkyl; preferably an alkyl group of from 1 to 8 carbon atoms, and most preferably an ethyl group; and
$A^-$ is an anion.

The structural nucleus described above may have additional substituents such as carboxy, sulfoxy, alkyl, alkoxy, etc. as generally known in the cyanine dye art.

The rigidized, thioalkyl substituted cyanine dyes having the central nucleus I, II, or III have been found to possess unexpected and particularly advantageous properties for both the spectral sensitization and manufacture of photothermographic imaging elements. Specifically, such dyes provide the elements of this invention with high photospeed (i.e., sensitivity), excellent contrast, improved Dmin, and low fog. Additionally, in the manufacture of photothermographic elements, the use of these dyes extends the pot-life of coating emulsions, so that there is less sensitometric change in the emulsions upon delayed coating. Surprisingly, the speed, Dmin, fog, and contrast provided by the thioalkyl-substituted dyes having the central nucleus I, II, or III are superior to the speed and contrast provided by non-rigidized dyes and rigidized dyes of similar structure but lacking the thioalkyl group. This is particularly true of these dyes when used in combination with supersensitizing compounds.

When the photothermographic element used in this invention is heat developed, preferably at a temperature of from about 80° C. to about 250° C. (176° F. to 482° F.) for a duration of from about 1 second to about 2 minutes, in a substantially water-free condition after, or simultaneously with, imagewise exposure, a black-and-white silver image is obtained.

The reducing agent for the non-photosensitive silver source may be any conventional photographic developer such as methyl gallate, hydroquinone, substituted-hydroquinones, catechol, pyrogallol, ascorbic acid, and ascorbic acid derivatives. However, it is preferred that the reducing agent be a hindered phenol developer. Further, the reducing agent may optionally comprise a compound capable of being oxidized to form or release a dye. Preferably the dye-forming material is a leuco dye.

The present invention also provides a process for the formation of a visible image by first exposing to electromagnetic radiation and thereafter heating the inventive photothermographic element described earlier herein.

The photothermographic elements of this invention may be used to prepare black-and-white, monochrome, or full color images. The photothermographic element of this invention can be used, for example, in conventional black-and-white or color photothermography, in electronically generated black-and-white or color hardcopy recording, in the graphic arts area (e.g., phototypesetting), in digital proofing, and in digital radiographic imaging. The element of this invention provides high photospeeds, provides strongly absorbing black-and-white or color images, and provides a dry and rapid process.

Heating in a substantially water-free condition as used herein, means heating at a temperature of 80° to 250° C. The term "substantially water-free condition" means that the reaction system is approximately in equilibrium with water in the air, and water for inducing or promoting the reaction is not particularly or positively supplied from the exterior to the element. Such a condition is described in T. H. James, *The Theory of the Photographic Process*, Fourth Edition, Macmillan 1977, page 374.

As used herein:

"photothermographic element" means a construction comprising at least one photothermographic emulsion layer and any supports, topcoat layers, image-receiving layers, blocking layers, antihalation layers, subbing or priming layers, etc;

"emulsion layer" means a layer of a photothermographic element that contains the non-photosensitive, reducible silver source and the photosensitive silver halide;

"ultraviolet region of the spectrum" means that region of the spectrum less than or equal to about 400 nm, preferably from about 100 nm to about 400 nm. More preferably, the ultraviolet region of the spectrum is the region between about 190 nm and about 400 nm;

"short wavelength visible region of the spectrum" means that region of the spectrum from about 400 nm to about 450 nm;

"infrared region of the spectrum" means from about 750 nm to about 1400 nm; "visible region of the spectrum" means from about 400 nm to about 750 nm; and "red region of the spectrum" means from about 640 nm to about 750 nm. Preferably the red region of the spectrum is from about 650 nm to about 700 nm.

As is well understood in this area, substitution is not only tolerated, but is often advisable and substitution is anticipated on the thioalkyl-substituted sensitizing dye compounds used in the present invention.

When a general structure is referred to as "a compound having the central nucleus" of a given formula, any substitution which does not alter the bond structure of the formula or the shown atoms within that structure is included within the formula, unless such substitution is specifically excluded by language (such as "free of carboxy-substituted alkyl"). For example, where there is a rigidized polymethine chain shown between two defined benzothiazole groups, substituent groups may be placed on the chain, on the tings in the chain, or on the benzothiazole groups, but the conjugation of the chain may not be altered and the atoms shown in the chain or in the benzothiazole groups may not be replaced.

When a general structure is referred to as "a general formula" it does not specifically allow for such broader substitution of the structure, but only such conventional substitution as would be recognized as equivalents or benefit specific (e.g., shifts wavelengths of absorbance, changes solubility, stabilizes the molecule, etc.) by one of ordinary skill in the art.

As a means of simplifying the discussion and recitation of certain substituent groups, the terms "group" and "moiety" are used to differentiate between those chemical species that may be substituted and those which may not be so substituted. Thus, when the term "group," or "aryl group," is used to describe a substituent, that substituent includes the use of additional substituents beyond the literal definition of the basic group. Where the term "moiety" is used to describe a substituent, only the unsubstituted group is intended to be included. For example, the phrase, "alkyl group" is intended to include not only pure hydrocarbon alkyl chains, such as methyl, ethyl, propyl, t-butyl, cyclohexyl, iso-octyl, octadecyl and the like, but also alkyl chains beating substituents known in the art, such as hydroxyl, alkoxy, phenyl, halogen atoms (F, Cl, Br, and I), cyano, nitro, amino, carboxy, etc. For example, alkyl group includes ether groups (e.g., $CH_3$—$CH_2$—$CH_2$—O—$CH_2$—), haloalkyls, nitroalkyls, carboxyalkyls, hydroxyalkyls, sulfoalkyls, etc. On the other hand, the phrase "alkyl moiety" is limited to the inclusion of only pure hydrocarbon alkyl chains, such as methyl, ethyl, propyl, t-butyl, cyclohexyl, iso-octyl, octadecyl, and the like. Substituents that react with active ingredients, such as very strongly electrophilic or oxidizing substituents, would of course be excluded by the ordinarily skilled artisan as not being inert or harmless.

Other aspects, advantages, and benefits of the present invention are apparent from the detailed description, examples, and claims.

DETAILED DESCRIPTION OF THE INVENTION

The dyes having the central nucleus I, II, or III are particularly effective sensitizers for photothermographic elements, give surprisingly better sensitivity to red and near infrared radiation, and exhibit superior Dmin and fog levels when compared with other cyanine dyes of similar structure. The stability provided for by the use of these dyes also surprisingly extends to pot-life stability. In many cases, the compounds of the invention were found to give at least two times the sensitivity than that obtained using similar compounds not possessing the at least one thioalkyl group. The dyes are particularly useful for sensitizing photothermographic elements in the region 720 to 900 nm, and more particularly 780 to 850 nm, thereby providing photothermographic elements which are well matched to sources emitting in that region, e.g., an infrared emitting diode (IRED).

The preferred dyes are heptamethine cyanine dyes and are well known and described in the literature, as compounds and as near infrared spectral sensitizers for conventional photographic silver halide emulsions, e.g., Hamer, *Cyanine Dyes and Related Compounds,* Interscience 1964. The synthesis of heptmethine cyanines is described, e.g., by Fischer and Hamer, *J. Chem. Soc.* 1933, 189. The existence and synthesis of dyes according to the present invention are also referenced in U.S. Pat. Nos. 5,108,662 and 4,975,221 described above; and *Research Disclosure,* September 1978, item 17363.

The preparation of infrared-absorbing dyes usually requires the presence of a long chain (e.g., a heptamethine chain) within the chromophoric system. However, as the chain length is increased, there is a concomitant decrease in dye stability.

sensitizing dye per mole of silver in the emulsion. Highly surprising in the practice of the present invention is the finding that smaller amounts can provide high degrees of sensitivity almost equivalent to the sensitivity provided by increased amounts. This is particularly unexpected, and again indicative of the differences between photography and photothermography since at least one of the references described above which show the use of thioalkyl substituted infrared sensitizing dyes in photographic constructions at high levels of the dye lowers spectral sensitization in the infrared. The preferred range of practice for the present invention would be a narrow range of preferably $2 \times 10^{-5}$ to $1 \times 10^{-3}$ moles of sensitizing dye per mole of silver, and most preferably $5 \times 10^{-5}$ to $8 \times 10^{-4}$ moles of sensitizing dye per mole of silver in the emulsion.

Representative spectrally sensitizing compounds (Dyes 1, 2, 3, and 4) useful in the present invention are shown below. These representations are exemplary and are not intended to be limiting.

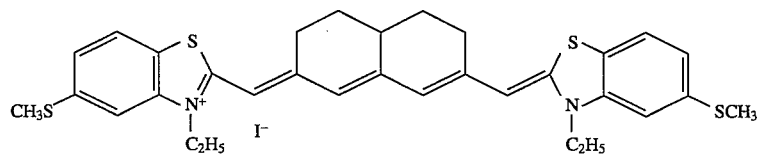

Dye-1

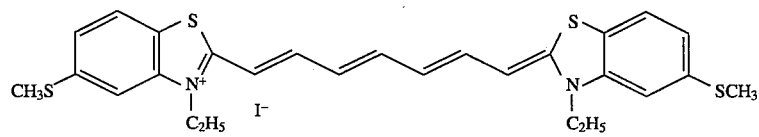

Dye-2

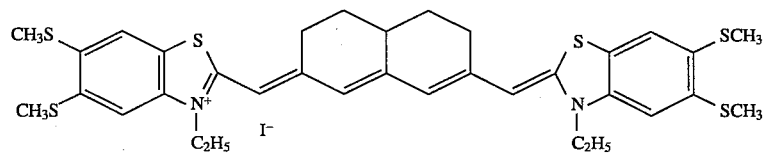

Dye-3

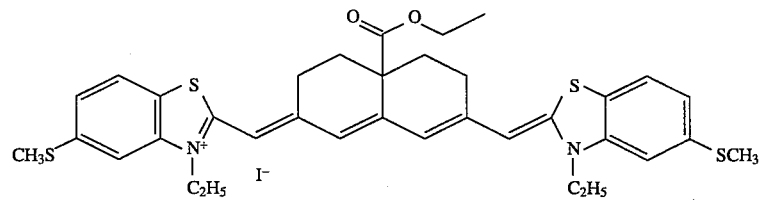

Dye-4

Rigidization by incorporating a tetrahydronaphthyl group into the polymethine chain of a cyanine dye having two benzothiazole groups was found to increase spectral sensitivity and shelf-life in the coated film as compared to nonrigidized dyes similarly stored. Surprisingly, the addition of a thioalkyl group to at least one of the of the two aromatic groups (e.g., benzothiazole groups) has been found to produce further increases in sensitivity as well as improvements in contrast, Dmin, fog, and extended pot-life as compared to dyes which lack these features. The compounds having the central nucleus I, II, or III describe such dyes. As is demonstrated in the Examples below, this technology has been successfully applied by the present inventors to photothermographic elements.

The compounds having the central nucleus I, II, or III may be incorporated into the photothermographic emulsions as spectral sensitizers in a conventional manner. Generally the concentration of the compounds having the central nucleus I, II, or III will be in the range $2 \times 10^{-8}$ to $4 \times 10^{-2}$ moles of The Photosensitive Silver Halide As noted above, the present invention includes a photosensitive silver halide. The photosensitive silver halide can be any photosensitive silver halide, such as silver bromide, silver iodide, silver chloride, silver bromoiodide, silver chlorobromoiodide, silver chlorobromide, etc. The photosensitive silver halide can be added to the emulsion layer in any fashion so long as it is placed in catalytic proximity to the organic silver compound which serves as a source of reducible silver.

The silver halide may be in any form which is photosensitive including, but not limited to cubic, octahedral, rhombic dodecahedral, orthorhombic, tetrahedral, other polyhedral habits, etc., and may have epitaxial growth of crystals thereon.

The silver halide grains may have a uniform ratio of halide throughout; they may have a graded halide content, with a continuously varying ratio of, for example, silver bromide and silver iodide; or they may be of the core-shelltype, having a discrete core of one halide ratio, and a discrete shell of another halide ratio. Core-shell silver halide grains useful in photothermographic elements and methods of preparing these materials are described in U.S. Pat. No. 5,382,504. A core-shell silver halide grain having an iridium doped core is particularly preferred. Iridium doped core-shell grains of this type are described in U.S. patent application Ser. No. 08/239,984 (filed May 9, 1994).

The silver halide may be prepared ex situ, (i.e., be pre-formed) and mixed with the organic silver salt in a binder prior to use to prepare a coating solution. The silver halide may be pre-formed by any means, e.g., in accordance with U.S. Pat. No. 3,839,049. For example, it is effective to blend the silver halide and organic silver salt using a homogenizer for a long period of time. Materials of this type are often referred to as "pre-formed emulsions." Methods of preparing these silver halide and organic silver salts and manners of blending them are described in *Research Disclosure*, June 1978, item 17029; U.S. Pat. Nos. 3,700,458 and 4,076,539; and Japanese Patent Application Nos. 13224/74, 42529/76, and 17216/75.

It is desirable in the practice of this invention to use pre-formed silver halide grains of less than 0.10 μm in an infrared sensitized, photothermographic element. Preferably the number average particle size of the grains is between 0.01 and 0.09 μm. It is also preferred to use iridium doped silver halide grains and iridium doped core-shell silver halide grains as disclosed in U.S. patent application Ser. Nos. 08/072,153, and 08/239,984 described above.

Pre-formed silver halide emulsions when used in the element of this invention can be unwashed or washed to remove soluble salts. In the latter case, the soluble salts can be removed by chill-setting and leaching or the emulsion can be coagulation washed, e.g., by the procedures described in U.S. Pat. Nos. 2,618,556; 2,614,928; 2,565,418; 3,241,969; and 2,489,341.

It is also effective to use an in situ process, i.e., a process in which a halogen-containing compound is added to an organic silver salt to partially convert the silver of the organic silver salt to silver halide.

The light sensitive silver halide used in the present invention can be employed in a range of about 0.005 mole to about 0.5 mole; preferably, from about 0.01 mole to about 0.15 mole per mole; and more preferably, from 0.03 mole to 0.12 mole per mole of non-photosensitive reducible silver salt, or in other parameters from 0.5 to 15% by weight of the emulsion (light sensitive layer), preferably from 1 to 10% by weight of said emulsion layer.

The silver halide used in the present invention may be chemically sensitized in a manner similar to that used to sensitize conventional wet-processed silver halide photographic materials, or state-of-the-art heat-developable photothermographic elements.

For example, it may be chemically sensitized with a chemical sensitizing agent, such as a compound containing sulfur, selenium, tellurium, etc., or a compound containing gold, platinum, palladium, ruthenium, rhodium, iridium, etc., a reducing agent such as a tin halide, etc., or a combination thereof. The details of these procedures are described in T. H. James, *The Theory of the Photographic Process*, Fourth Edition, Chapter 5, pp. 149 to 169. Suitable chemical sensitization procedures are also disclosed in Shepard, U.S. Pat. No. 1,623,499; Waller, U.S. Pat. No. 2,399,083; McVeigh, U.S. Pat. No. 3,297,447; and Dunn, U.S. Pat. No. 3,297,446.

Supersensitizers

To get the speed of the photothermographic elements up to maximum levels and further enhance sensitivity, it is often desirable to use supersensitizers. Any supersensitizer can be used which increases the sensitivity. For example, preferred infrared supersensitizers are described in U.S. patent application Ser. No. 08/091,000 (filed Jul. 13, 1993) and include heteroaromatic mercapto compounds or heteroaromatic disulfide compounds of the formula:

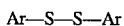

wherein: M represents a hydrogen atom or an alkali metal atom.

In the above noted supersensitizers, Ar represents a heteroaromatic ring or fused heteroaromatic ring containing one or more of nitrogen, sulfur, oxygen, selenium or tellurium atoms. Preferably, the heteroaromatic ring is benzimidazole, naphthimidazole, benzothiazole, naphthothiazole, benzoxazole, naphthoxazole, benzoselenazole, benzotellurazole, imidazole, oxazole, pyrazole, triazole, thiadiazole, tetrazole, triazine, pyrimidine, pyridazine, pyrazine, pyridine, purine, quinoline or quinazolinone. However, other heteroaromatic rings are envisioned under the breadth of this invention.

The heteroaromatic ring may also carry substituents with examples of preferred substituents being selected from the group consisting of halogen (e.g., Br and Cl), hydroxy, amino, carboxy, alkyl (e.g., of 1 or more carbon atoms, preferably 1 to 4 carbon atoms) and alkoxy (e.g., of 1 or more carbon atoms, preferably of 1 to 4 carbon atoms.

Preferred supersensitizers are mercapto-substituted benzimidazoles, benzoxazoles, and benzothiazoles, such as 5-methyl-2-mercaptobenzimidazole, 2-mercaptobenzimidazole, 2-mercaptobenzoxazole, 2-mercaptobenzothiazole, and 2-mercapto-5-methylbenzimidazole. Other mercapto-substituted, heteroaromatic compounds which may be used as supersensitizers include: 6-ethoxy-2-mercaptobenzothiazole, 2,2'-dithiobis-(benzothiazole), 3-mercapto-1,2,4-triazole, 4,5-diphenyl-2-imadazolethiol, 2-mercaptoimidazole, 1-ethyl-2-mercaptobenzimidazole, 2-mercaptoquinoline, 8-mercaptopurine, 2-mercapto-4(3H)-quinazolinone, 7-trifluoromethyl-4-quinolinethiol, 2,3,5,6-tetrachloro-4-pyridinethiol, 4-amino-6-hydroxy-2-mercaptopyrimidine monohydrate, 2-amino-5-mercapto-1,3,4-thiadiazole, 3-amino-5-mercapto-1,2,4-triazole, 4-hydroxy-2-mercaptopyrimidine, 2-mercaptopyrimidine, 4,6-diamino-2-mercaptopyrimidine, 2-mercapto-4-methylpyrimidine hydrochloride, 3-mercapto-5-phenyl-1,2,4-triazole, 2-mercapto-4-phenyloxazole.

Most preferred supersensitizers are 2-mercaptobenzimidazole, 2-mercapto-5-methylbenzimidazole, 2-mercaptobenzothiazole, and 2-mercaptobenzoxazole.

The supersensitizers are used in general amount of at least 0.001 moles of sensitizer per mole of silver in the emulsion layer. Usually the range is between 0.001 and 1.0 moles of the compound per mole of silver and preferably between 0.01 and 0.3 moles of compound per mole of silver.

The Non-Photosensitive Reducible Silver Source

The present invention includes a non-photosensitive reducible silver source. The non-photosensitive reducible silver source that can be used in the present invention can be any compound that contains a source of reducible silver ions. Preferably, it is a silver salt which is comparatively stable to light and forms a silver image when heated to 80° C. or higher in the presence of an exposed photocatalyst (such as silver halide) and a reducing agent.

Silver salts of organic acids, particularly silver salts of long chain fatty carboxylic acids, are preferred. The chains typically contain 10 to 30, preferably 15 to 28, carbon atoms. Suitable organic silver salts include silver salts of organic compounds having a carboxyl group. Examples thereof include a silver salt of an aliphatic carboxylic acid and a silver salt of an aromatic carboxylic acid. Preferred examples of the silver salts of aliphatic carboxylic acids include silver behenate, silver stearate, silver oleate, silver laureate, silver caprate, silver myristate, silver palmitate, silver maleate, silver fumarate, silver tartarate, silver furoate, silver linoleate, silver butyrate, silver camphorate, and mixtures thereof, etc. Silver salts that can be substituted with a halogen atom or a hydroxyl group also can be effectively used. Preferred examples of the silver salts of aromatic carboxylic acid and other carboxyl group-containing compounds include: silver benzoate, a silver-substituted benzoate, such as silver 3,5-dihydroxybenzoate, silver o-methylbenzoate. silver m-methylbenzoate, silver p-methylbenzoate, silver 2,4-dichlorobenzoate. silver acetamidobenzoate, silver p-phenylbenzoate, etc.; silver gallate; silver tannate; silver phthalate; silver terephthalate; silver salicylate; silver phenylacetate; silver pyromellilate; a silver salt of 3-carboxymethyl-4-methyl-4-thiazoline-2-thione or the like as described in U.S. Pat. No. 3,785,830; and a silver salt of an aliphatic carboxylic acid containing a thioether group as described in U.S. Pat. No. 3,330,663.

Silver salts of compounds containing mercapto or thione groups and derivatives thereof can also be used. Preferred examples of these compounds include: a silver salt of 3-mercapto-4-phenyl-1,2,4-triazole; a silver salt of 2-mercaptobenzimidazole; a silver salt of 2-mercapto-5-aminothiadiazole; a silver salt of 2-(2-ethylglycolamido)benzothiazole; a silver salt of thioglycolic acid, such as a silver salt of a S-alkylthioglycolic acid (wherein the alkyl group has from 12 to 22 carbon atoms); a silver salt of a dithiocarboxylic acid such as a silver salt of dithioacetic acid; a silver salt of thioamide; a silver salt of 5-carboxylic-1-methyl-2-phenyl-4-thiopyridine; a silver salt of mercaptotriazine; a silver salt of 2-mercaptobenzoxazole; a silver salt as described in U.S. Pat. No. 4,123,274, for example, a silver salt of a 1,2,4-mercaptothiazole derivative, such as a silver salt of 3-amino-5-benzylthio-1,2,4-thiazole; and a silver salt of a thione compound, such as a silver salt of 3-(2-carboxyethyl)-4-methyl-4-thiazoline-2-thione as disclosed in U.S. Pat. No. 3,201,678.

Furthermore, a silver salt of a compound containing an imino group can be used. Preferred examples of these compounds include: silver salts of benzotriazole and substituted derivatives thereof, for example, silver methylbenzotriazole and silver 5-chlorobenzotriazole, etc.; silver salts of 1,2,4-triazoles or 1-H-tetrazoles as described in U.S. Pat. No. 4,220,709; and silver salts of imidazoles and imidazole derivatives.

Silver salts of acetylenes can also be used. Silver acetylides are described in U.S. Pat. Nos. 4,761,361 and 4,775,613.

It is also found convenient to use silver half soaps. A preferred example of a silver half soap is an equimolar blend of silver behenate and behenic acid, which analyzes for about 14.5% by weight solids of silver in the blend and which is prepared by precipitation from an aqueous solution of the sodium salt of commercial behenic acid.

Transparent sheet elements made on transparent film backing require a transparent coating. For this purpose a silver behenate full soap, containing not more than about 15% of free behenic acid and analyzing about 22% silver, can be used.

The method used for making silver soap emulsions is well known in the art and is disclosed in *Research Disclosure,* April 1983, item 22812, *Research Disclosure,* October 1983, item 23419, and U.S. Pat. No. 3,985,565.

The silver halide and the non-photosensitive reducible silver source that form a starting point of development should be in catalytic proximity, i.e., reactive association. "Catalytic proximity" or "reactive association" means that they should be in the same layer, in adjacent layers, or in layers separated from each other by an intermediate layer having a thickness of less than 1 micrometer (1 μm). It is preferred that the silver halide and the non-photosensitive reducible silver source be present in the same layer.

The source of reducible silver generally constitutes about 5 to about 70% by weight of the emulsion layer. It is preferably present at a level of about 10 to about 50% by weight of the emulsion layer.

The Reducing Agent for the Non-Photosensitive Reducible Silver Source

When used in black-and-white photothermographic elements, the reducing agent for the organic silver salt may be any compound, preferably organic compound, that can reduce silver ion to metallic silver. Conventional photographic developers such as phenidone, hydroquinones, and catechol are useful, but hindered bisphenol reducing agents are preferred.

A wide range of reducing agents has been disclosed in dry silver systems including amidoximes, such as phenylamidoxime, 2-thienylamidoxime and p-phenoxy-phenylamidoxime; azines, such as 4-hydroxy-3,5-dimethoxybenzaldehydeazine; a combination of aliphatic carboxylic acid aryl hydrazides and ascorbic acid, such as 2,2'-bis(hydroxymethyl)propionyl-β-phenylhydrazide in combination with ascorbic acid; a combination of polyhydroxybenzene and hydroxylamine; a reductone and/or a hydrazine, such as a combination of hydroquinone and bis(ethoxyethyl)hydroxylamine, piperidinohexose reductone, or formyl-4-methylphenylhydrazine; hydroxamic acids, such as phenylhydroxamic acid, p-hydroxyphenylhydroxamic acid, and o-alaninehydroxamic acid; a combination of azines and sulfonamidophenols, such as phenothiazine with p-benzenesulfonamidophenol or 2,6-dichloro-4-benzenesulfonamidophenol; α-cyanophenylacetic acid derivatives, such as ethyl α-cyano-2-methylphenylacetate, ethyl α-cyano-phenylacetate; a combination of bis-o-naphthol and a 1,3-dihydroxybenzene derivative, such as 2,4-dihydroxybenzophenone or 2,4-dihydroxyacetophenone; 5-pyrazolones such as 3-methyl-1-phenyl-5-pyrazolone; reductones, such as dimethylaminohexose reductone, anhydrodihydroaminohexose reductone, and anhydrodihydro-piperidone-hexose reductone; sulfonamidophemol reducing agents, such as 2,6-dichloro-4-benzenesulfonamidophenol and p-benzenesulfonamidophenol; indane-1,3-diones, such as 2-phenylindane-1,3-dione; chromans, such as 2,2-dimethyl-7-t-butyl-6-hydroxychroman; 1,4-dihydropyridines, such as 2,6-dimethoxy-3,5-dicarbethoxy-1,4-dihydropyridine; ascorbic acid derivatives, such as 1-ascorbylpalmitate, ascorbylstearate; unsaturated aldehydes and ketones; certain 1,3-indanediones, and 3-pyrazolidones (phenidones).

Hindered bisphenol developers are compounds that contain only one hydroxy group on a given phenyl ring and have at least one additional substituent located ortho to the hydroxy group. They differ from traditional photographic developers which contain two hydroxy groups on the same phenyl ring (such as is found in hydroquinones). Hindered phenol developers may contain more than one hydroxy group as long as they are located on different phenyl rings.

Hindered phenol developers include, for example, binaphthols (i.e., dihydroxybinaphthyls), biphenols (i.e., dihydroxybiphenyls), bis(hydroxynaphthyl)methanes, bis(hydroxyphenyl)methanes, hindered phenols, and naphthols.

Non-limiting representative bis-o-naphthols, such as by 2,2'-dihydroxyl-1-binaphthyl, 6,6'-dibromo-2,2'-dihydroxy-1,1'-binaphthyl, and bis(2-hydroxy-1-naphthyl)methane. For additional compounds see U.S. Pat. No. 5,262,295 at column 6, lines 12–13, incorporated herein by reference.

Non-limiting representative biphenols include 2,2'-dihydroxy-3,3'-di-t-butyl-5,5-dimethylbiphenyl; 2,2'-dihydroxy-3,3',5,5'-tetra-t-butylbiphenyl; 2,2'-dihydroxy-3,3'-di-t-butyl- 5,5'-dichlorobiphenyl; 2-(2-hydroxy-3-t-butyl-5-methylphenyl)-4-methyl-6-n-hexylphenol; 4,4'-dihydroxy-3,3',5,5'-tetra-t-butylbiphenyl; and 4,4'-dihydroxy-3,3',5,5'-tetramethylbiphenyl. For additional compounds see U.S. Pat. No. 5,262,295 at column 4, lines 17–47, incorporated herein by reference.

Non-limiting representative bis(hydroxynaphthyl)methanes include 2,2'-methylene-bis(2-methyl-1-naphthol)methane. For additional compounds see U.S. Pat. No. 5,262,295 at column 6, lines 14–16, incorporated herein by reference.

Non-limiting representative bis(hydroxyphenyl)methanes include bis(2-hydroxy-3-t-butyl-5-methylphenyl)methane (CAO-5); 1,1-bis(2-hydroxy-3,5-dimethylphenyl)-3,5,5-trimethylhexane (Permanaxp™ or Nonox™); 1,1'-bis(3,5-tetra-t-butyl-4-hydroxy)methane; 2,2-bis(4-hydroxy-3-methylphenyl)propane; 4,4-ethylidene-bis(2-t-butyl-6-methylphenol); and 2,2-bis(3,5-dimethyl-4-hydroxyphenyl)propane. For additional compounds see U.S. Pat. No. 5,262,295 at column 5 line 63 to column 6, line 8 incorporated herein by reference.

Non-limiting representative hindered phenols include 2,6-di-t-butylphenol; 2,6-di-t-butyl-4-methylphenol; 2,4-di-t-butylphenol; 2,6-dichlorophenol; 2,6-dimethylphenol; and 2-t-butyl-6-methylphenol.

Non-limiting representative hindered naphthols include 1-naphthol; 4-methyl-1-naphthol; 4-methoxy-1-naphthol; 4-chloro-1-naphthol; and 2-methyl-1-naphthol. For additional compounds see U.S. Pat. No. 5,262,295 at column 6, lines 17–20, incorporated herein by reference.

The reducing agent should be present as 1 to 10% by weight of the imaging layer. In multilayer elements, if the reducing agent is added to a layer other than an emulsion layer, slightly higher proportions, of from about 2 to 15%, tend to be more desirable.

The Binder

The photosensitive silver halide, the non-photosensitive reducible source of silver, the reducing agent, and any other addenda used in the present invention are generally added to at least one binder. The binder(s) that can be used in the present invention can be employed individually or in combination with one another. It is preferred that the binder be selected from polymeric materials, such as, for example, natural and synthetic resins that are sufficiently polar to hold the other ingredients in solution or suspension.

A typical hydrophilic binder is a transparent or translucent hydrophilic colloid. Examples of hydrophilic binders include: a natural substance, for example, a protein such as gelatin, a gelatin derivative, a cellulose derivative, etc.; a polysaccharide such as starch, gum arabic, pullulan, dextrin, etc.; and a synthetic polymer, for example, a water-soluble polyvinyl compound such as polyvinyl alcohol, polyvinyl pyrrolidone, acrylamide polymer, etc. Another example of a hydrophilic binder is a dispersed vinyl compound in latex form which is used for the purpose of increasing dimensional stability of a photographic element.

Examples of typical hydrophobic binders are polyvinyl acetals, polyvinyl chloride, polyvinyl acetate, cellulose acetate, polyolefins, polyesters, polystyrene, polyacrylonitrile, polycarbonates, methacrylate copolymers, maleic anhydride ester copolymers, butadiene-styrene copolymers, and the like. Copolymers, e.g., terpolymers, are also included in the definition of polymers. The polyvinyl acetals, such as polyvinyl butyral and polyvinyl formal, and vinyl copolymers such as polyvinyl acetate and polyvinyl chloride are particularly preferred.

Although the binder can be hydrophilic or hydrophobic, preferably it is hydrophobic in the silver containing layer(s). Optionally, these polymers may be used in combination of two or more thereof.

The binders are preferably used at a level of about 30–90% by weight of the emulsion layer, and more preferably at a level of about 45–85% by weight. Where the proportions and activities of the reducing agent for the non-photosensitive reducible source of silver require a particular developing time and temperature, the binder should be able to withstand those conditions. Generally, it is preferred that the binder not decompose or lose its structural integrity at 250° F. (121° C.) for 60 seconds, and more preferred that it not decompose or lose its structural integrity at 350° F. (177° C.) for 60 seconds.

The polymer binder is used in an amount sufficient to carry the components dispersed therein, that is, within the effective range of the action as the binder. The effective range can be appropriately determined by one skilled in the art.

Photothermographic Formulations

The formulation for the photothermographic emulsion layer can be prepared by dissolving and dispersing the binder, the photosensitive silver halide, the non-photosensitive reducible source of silver, the reducing agent for the non-photosensitive reducible silver source, and optional additives, in an inert organic solvent, such as, for example, toluene, 2-butanone, or tetrahydrofuran.

The use of "toners" or derivatives thereof which improve the image, is highly desirable, but is not essential to the element. Toners can be present in an amount of about 0.01–10% by weight of the emulsion layer, preferably about 0.1–10% by weight. Toners are well known compounds in the photothermographic art, as shown in U.S. Pat. Nos. 3,080,254; 3,847,612; and 4,123,282.

Examples of toners include: phthalimide and N-hydroxyphthalimide; cyclic imides, such as succinimide, pyrazoline-5-ones, quinazolinone, 1-phenylurazole, 3-phenyl-2-pyrazoline-5-one, and 2,4-thiazolidinedione; naphthalimides, such as N-hydroxy-1,8-naphthalimide; cobalt complexes, such as cobaltic hexamine trifluoroacetate; mercaptans such as 3-mercapto-1,2,4-triazole, 2,4-odimercaptopyrimidine, 3-mercapto-4,5-diphenyl-1,2,4-triazole and 2,5-dimercapto-1,3,4-thiadiazole; N-(aminomethyl)aryldicarboximides, such as (N,N-dimethylaminomethyl)phthalimide, and N-(dimethylaminomethyl)naphthalene-2,3-dicarboximide; a combination of blocked pyrazoles, isothiuronium derivatives, and certain photobleach agents, such as a combination of N,N'-hexamethylene-bis(1-carbamoyl-3,5-dimethylpyrazole), 1,8-(3,6-diazaoctane)bis(isothiuronium)trifluoroacetate, and 2-(tribromomethylsulfonyl benzothiazole); merocyanine dyes such as 3-ethyl-5-[(3-ethyl-2-benzothiazolinylidene)-1-methyl-ethylidene]-2-thio-2,4-o-azolidinedione; phthalazinone, phthalazinone derivatives, or metal salts or these derivatives, such as 4-(1-naphthyl)phthalazinone, 6-chlorophthalazinone, 5,7-dimethoxyphthalazinone, and 2,3-dihydro-1,4-phthalazinedione; a combination of phthalazine plus one or more phthalic acid derivatives, such as phthalic acid, 4-methylphthalic acid, 4-nitrophthalic acid, and tetrachlorophthalic anhydride, quinazolinediones, benzoxazine or naphthoxazine derivatives; rhodium complexes functioning not only as tone modifiers but also as sources of halide ion for silver halide formation in situ, such as ammonium hexachlororhodate (III), rhodium bromide, rhodium nitrate, and potassium hexachlororhodate (III); inorganic peroxides and persulfates, such as ammonium peroxydisulfate and hydrogen peroxide; benzoxazine-2,4-diones, such as 1,3-benzoxazine-2,4-dione, 8-methyl-1,3-benzoxazine-2,4-dione, and 6-nitro-1,3-benzoxazine-2,4-dione; pyrimidines and asym-triazines, such as 2,4-dihydroxypyrimidine, 2-hydroxy-4-aminopyrimidine, and azauracil; and tetraapentalene derivatives, such as 3,6-dimercapto-1,4-diphenyl-1H, 4H-2,3a,5,6a-tetraazapentalene and 1,4-di-(o-chlorophenyl)-3,6-dimercapto-1H,4H-2,3a,5,6a-tetraazapentalene.

The photothemmgraphic elements used in this invention can be further protected against the production of fog and can be further stabilized against loss of sensitivity during storage. While not necessary for the practice of the invention, it may be advantageous to add mercury (II) salts to the emulsion layer(s) as an antifoggant. Preferred mercury (II) salts for this purpose are mercuric acetate and mercuric bromide.

Other suitable antifoggants and stabilizers, which can be used alone or in combination include the thiazolium salts described in U.S. Pat. Nos. 2,131,038 and U.S. Pat. No. 2,694,716; the azaindenes described in U.S. Pat. Nos. 2,886,437; the triazaindolizines described in U.S. Pat. No. 2,444,605; the mercury salts described in U.S. Pat. No. 2,728,663; the urazoles described in U.S. Pat. No. 3,287,135; the sulfocatechols described in U.S. Pat. No. 3,235,652; the oximes described in British Patent No. 623,448; the polyvalent metal salts described in U.S. Pat. No. 2,839,405; the thiuronium salts described in U.S. Pat. No. 3,220,839; and palladium, platinum and gold salts described in U.S. Pat. Nos. 2,566,263 and 2,597,915. Stabilizer precursor compounds capable of releasing stabilizers upon application of heat during development can also be use in combination with the stabilizers of this invention. Such precursor compounds are described in, for example, U.S. Pat. Nos. 5,158,866, 5,175,081, 5,298,390, and 5,300,420.

Photothermographic elements of the invention can contain plasticizers and lubricants such as polyalcohols and diols of the type described in U.S. Pat. No. 2,960,404; fatty acids or esters, such as those described in U.S. Pat. Nos. 2,588,765 and 3,121,060; and silicone resins, such as those described in British Patent No. 955,061.

Photothermographic elements containing emulsion layers described herein may contain matting agents such as starch, titanium dioxide, zinc oxide, silica, and polymeric beads including beads of the type described in U.S. Pat. Nos. 2,992,101 and 2,701,245.

Emulsions in accordance with this invention may be used in photothermographic elements which contain antistatic or conducting layers, such as layers that comprise soluble salts, e.g., chlorides, nitrates, etc., evaporated metal layers, ionic polymers such as those described in U.S. Pat. Nos. 2,861,056, and 3,206,312 or insoluble inorganic salts such as those described in U.S. Pat. No. 3,428,451.

The photothermographic elements of this invention may also contain electroconductive under-layers to reduce static electricity effects and improve transport through processing equipment. Such layers are described in U.S. Pat. No. 5,310,640.

Photothermographic Constructions

The photothermographic elements of this invention may be constructed of one or more layers on a support. Single layer elements should contain the silver halide, the non-photosensitive, reducible silver source, the reducing agent for the non-photosensitive reducible silver source, the binder as well as optional materials such as toners, acutance dyes, coating aids, and other adjuvants.

Two-layer constructions should contain silver halide and non-photosensitive, reducible silver source in one emulsion layer (usually the layer adjacent to the support) and some of the other ingredients in the second layer or both layers. Two layer constructions comprising a single emulsion layer coating containing all the ingredients and a protective topcoat are also envisioned.

Multicolor photothermographic dry silver elements can contain sets of these bilayers for each color or they can contain all ingredients within a single layer, as described in U.S. Pat. No. 4,708,928.

Barrier layers, preferably comprising a polymeric material, can also be present in the photothermographic element of the present invention. Polymers for the barrier layer can be selected from natural and synthetic polymers such as gelatin, polyvinyl alcohols, polyacrylic acids, sulfonated polystyrene, and the like. The polymers can optionally be blended with barrier aids such as silica.

Photothermographic emulsions used in this invention can be coated by various coating procedures including wire wound rod coating, dip coating, air knife coating, curtain coating, or extrusion coating using hoppers of the type described in U.S. Pat. No. 2,681,294. If desired, two or more layers can be coated simultaneously by the procedures described in U.S. Pat. Nos. 2,761,791; 5,340,613; and British Patent No. 837,095. Typical wet thickness of the emulsion layer can be about 10–150 micrometers ($\mu$m), and the layer can be dried in forced air at a temperature of about 20°–100° C. It is preferred that the thickness of the layer be selected to provide maximum image densities greater than 0.2, and, more preferably, in the range 0.5 to 4.5, as measured by a MacBeth Color Densitometer Model TD 504 using the color filter complementary to the dye color.

Photothermographic elements according to the present invention can contain acutance dyes and antihalation dyes. The dyes may be incorporated into the photothermographic emulsion layer as acutance dyes according to known techniques. The dyes may also be incorporated into antihalation layers according to known techniques as an antihalation backing layer, an antihalation underlayer or as an overcoat. It is preferred that the photothermographic elements of this invention contain an antihalation coating on the support opposite to the side on which the emulsion and topcoat layers are coated. Antihalation and acutance dyes useful in the present invention are described in U.S. Pat. Nos. 5,135,842; 5,226,452; 5,314,795, and. 5,380,635.

Development conditions will vary, depending on the construction used, but will typically involve heating the photothermographic element in a substantially water-free condition after, or simultaneously with, imagewise exposure at a suitably elevated temperature. Thus, the latent image obtained after exposure can be developed by heating the element at a moderately elevated temperature of, from about 80° C. to about 250° C. (176° F. to 482° F.), preferably from about 100° C. to about 200° C. (212° F. to 392° F.), for a sufficient period of time, generally about 1 second to about 2 minutes. When used in a black-and-white element, a black-and white silver image is obtained. When used in a monochrome or full-color element, a dye image is obtained simultaneously with the formation of a black-and-white silver image. Heating may be carried out by the typical heating means such as an oven, a hot plate, an iron, a hot roller, a heat generator using carbon or titanium white, or the like.

If desired, the imaged element may be subjected to a first heating step at a temperature and for a time sufficient to intensify and improve the stability of the latent image but insufficient to produce a visible image and later subjected to a second heating step at a temperature and for a time sufficient to produce the visible image. Such a method and its advantages are described in U.S. Pat. No. 5,279,928.

The Support

Photothermographic emulsions used in the invention can be coated on a wide variety of supports. The support, or substrate, can be selected from a wide range of materials depending on the imaging requirement. Supports may be transparent or at least translucent. Typical supports include polyester film, subbed polyester film (e.g.,polyethylene terephthalate or polyethylene naphthalate), cellulose acetate film, cellulose ester film, polyvinyl acetal film, polyolefinic film (e.g., polyethylene or polypropylene or blends thereof), polycarbonate film and related or resinous materials, as well as glass, paper, and the like. Typically, a flexible support is employed, especially a polymeric film support, which can be partially acetylated or coated, particularly with a polymeric subbing or priming agent. Preferred polymeric materials for the support include polymers having good heat stability, such as polyesters. Particularly preferred polyesters are polyethylene terephthalate and polyethylene naphthalate.

A support with a backside resistive heating layer can also be used photothermographic imaging systems such as shown in U.S. Pat. No. 4,374,921.

Use as a Photomask

The possibility of low absorbance of the photothermographic element in the range of 350–450 nm in non-imaged areas facilitates the use of the photothermographic elements of the present invention in a process where there is a subsequent exposure of an ultraviolet or short wavelength visible radiation sensitive imageable medium. For example, imaging the photothermographic element with coherent radiation and subsequent development affords a visible image. The developed photothermographic element absorbs ultraviolet or short wavelength visible radiation in the areas where there is a visible image and transmits ultraviolet or short wavelength visible radiation where there is no visible image. The developed element may then be used as a mask and placed between an ultraviolet or short wavelength visible radiation energy source and an ultraviolet or short wavelength visible radiation photosensitive imageable medium such as, for example, a photopolymer, diazo compound, or photoresist. This process is particularly useful where the imageable medium comprises a printing plate and the photothermographic element serves as an imagesetting film.

Objects and advantages of this invention will now be illustrated by the following examples, but the particular materials and amounts thereof recited in these examples, as well as other conditions and details, should not be construed to unduly limit this invention.

EXAMPLES

All materials used in the following examples are readily available from standard commercial sources, such as Aldrich Chemical Co. (Milwaukee, Wis.). All percentages are by weight unless otherwise indicated. The following additional temps and materials were used.

Acryloid™ A-21 is a poly(methyl methacrylate) polymer available from Rohm and Haas, Philadelphia, Pa.

Butvar™ B-79 is a poly(vinyl butyral) resins available from Monsanto Company, St. Louis, Mo.

CAB 171-15S and CAB 381-20 are cellulose acetate butyrate polymers available from Eastman Chemical Co., Kingsport, Tenn.

CBBA is 2-(4-chlorobenzoyl)benzoic acid.

MEK is methyl ethyl ketone (2-butanone).

MMBI is 5-methyl-2-mercaptobenzimidazole. It is a supersensitizer.

4-MPA is 4-methylphthalic acid.

Nonox™ is 1,1-bis (2-hydroxy-3,5-dimethylphenyl)-3,5,5-trimethylhexane [CAS RN=7292-14-0] and is available from St. Jean PhotoChemicals, Inc., Quebec. It is a hindered phenol reducing agent (i.e., a developer) for the non-photosensitive reducible source of silver. It is also known as Permanax™ WSO.

PET is polyethylene terephthalate.

PHZ is phthalazine.

PHP is pyridinium hydrobromide perbromide.

TCPAN is tetrachlorophthalic anhydride.

TCPA is tetrachlorophthalic acid.

THDI is Desmodur™ N-100, a biuretized hexamethylenediisocyanate available from Miles Chemical Corporation.

Antifoggant 1 (AF-1) has the following structure

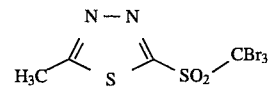

Fluorinated Terpolymer A (FT-A) has the following random polymer structure, where m=7, n=2 and p=1. The preparation of fluorinated terpolymer A is described in U.S. Pat. No. 5,380,644.

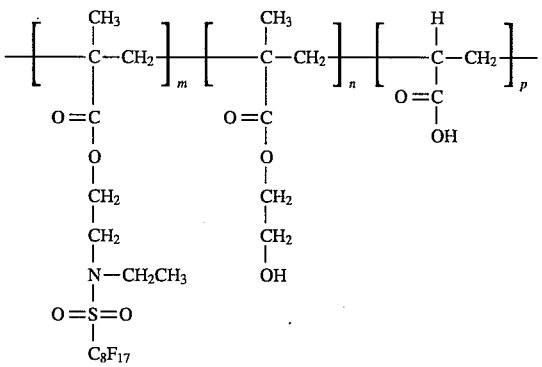

Antihalation Dye-1 (AH Dye-1) has the following structure. The preparation of this compound is described in Example 1 f of U.S. Pat. No. 5,380,635.

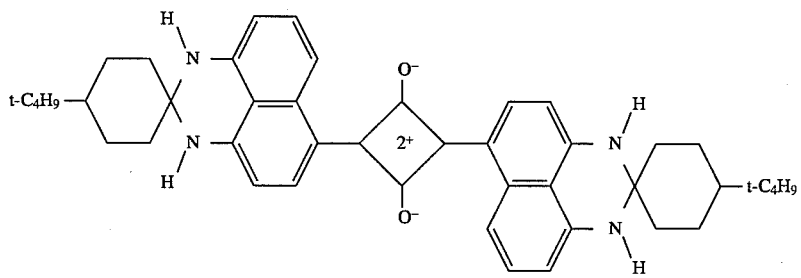

Vinyl Sulfone-1 (VS-1) is described in European Laid Open Patent Application No. 0 600 589 A2 and has the following structure.

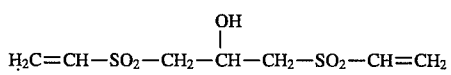

The following dyes were used. Dyes 1 to 4 are dyes of this invention. Dye-C-1 through Dye-C-4 are comparative dyes.

The following comparative dyes were evaluated:

Dye-C-1 is a rigidized comparative dye which contains a methoxy ($CH_3O-$) group in place of the thiomethyl ($CH_3S-$) group.

Dye-C-2 is a rigidized comparative dye which contains a Hydrogen ($H-$) group in place of the thiomethyl ($CH_3S-$) group.

Dye-C-3 is a rigidized comparative dye which contains a carboxyalkyl group in place of the ethyl group and a Hydrogen ($H-$) group in place of the thiomethyl ($CH_3S-$) group.

Dye-C-4 is a comparative dye which contains a non-rigidized chain and a Hydrogen ($H-$) group in place of the thiomethyl ($CH_3S-$) group.

Preparation of Iridium-Doped Core-Shell Silver Iodobromide

Emulsion: To a first solution (Solution A) having 30 g of phthalated gelatin dissolved in 1500 mL of &ionized water, held at 34° C., were simultaneously added; a second solution (Solution B) containing potassium bromide, and potassium iodide, and a third solution (Solution C) which was an aqueous solution containing 1.4 to 1.8 moles silver nitrate per liter. pAg was held at a constant value by means of a pAg feedback control loop as described in *Research Disclosure No.* 17643, U.S. Pat. Nos. 3,415,650; 3,782,954; and 3,821, 002. After a certain percentage of the total delivered silver nitrate was added, the second halide solution (Solution B), was replaced with Solution D which contained potassium bromide and iridium salt ($2 \times 10^{-5}$ mole Ir/mole halide) and Solution C was replaced with Solution E.

For illustration, the procedure for the preparation of 1 mole of emulsion is shown below.

Dye-C-1

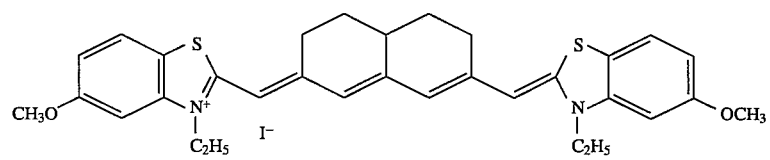

Dye-C-2

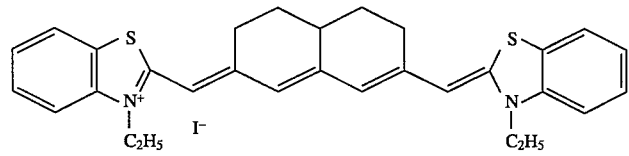

Dye-C-3

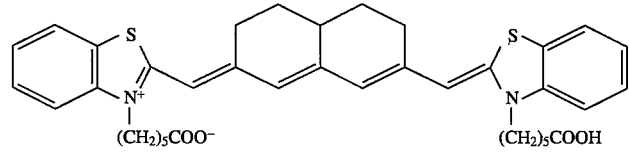

Dye-C-4

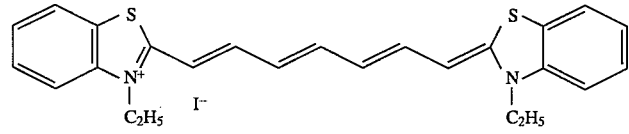

Solution A was prepared at 32° C. as follows:

| | |
|---|---|
| gelatin | 30 g |
| deionized Water | 1500 mL |
| 0.1 M KBr | 6 mL |
| adjust to pH = 5.0 with 3N HNO$_3$ | |

Solution B was prepared at 25° C. as follows:

| | |
|---|---|
| KBr | 27.4 g |
| KI | 3.3 g |
| deionized Water | 275.0 g |

Solution C was prepared at 25° C. as follows:

| | |
|---|---|
| AgNO$_3$ | 42.5 g |
| deionized Water | 364.0 g |

Solutions B and C were jetted into Solution A over 9.5 minutes.

Solution D was prepared at 25° C. as follows:

| | |
|---|---|
| KBr | 179. g |
| K$_2$IrCl$_6$ | 0.010 g |
| Deionized Water | 812. g |

Solution E was prepared at 25° C. as follows:

| | |
|---|---|
| AgNO$_3$ | 127. g |
| deionized Water | 1090. g |

Solutions D and E were jetted into Solution A over 28.5 minutes.

The emulsion was washed with water and then desalted. The average grain size was 0.045 μm as determined by Scanning Electron Microscopy (SEM).

Preparation of Iridium-Doped Pre-formed Silver Halide/Silver Organic Salt Dispersion: A silver halide/silver organic salt dispersion was prepared as described below. This material is also referred to as a silver soap dispersion or emulsion.

I. Ingredient
1. Pre-formed silver halide emulsion 0.10 mole at 700 g/mole in 1.25 liter H$_2$O at 42° C.
2. 89.18 g of NaOH in 1.50 liter H$_2$O
3. 364.8 g of AgNO$_3$ in 2.5 liter H$_2$O
4. 118 g of Humko Type 9718 fatty acid (available from Witco. Co., Memphis, Tenn.)
5. 570 g of Humko Type 9022 fatty acid (available from Witco. Co., Memphis, Tenn.)
6. 19 mL of conc. HNO$_3$ in 50 mL H$_2$O II. Reaction
1. Dissolve ingredients #4 and #5 at 80° C. in 13 liter of H$_2$O and mix for 15 minutes.
2. Add ingredient #2 to Step 1 at 80° C. and mix for 5 minutes to form a dispersion.
3. Add ingredient #6 to the dispersion at 80° C., cooling the dispersion to 55° C. and stirring for 25 minutes.
4. Add ingredient #1 to the dispersion at 55° C. and mix for 5 minutes.
5. Add ingredient #3 to the dispersion at 55° C. and mix for 10 minutes.
6. Wash until wash water has a resistivity of 20,000 ohm/cm$^2$.
7. Dry at 45° C. for 72 hours.

Homogenization of Pre-formed Soaps (Homogenate): A pre-formed silver fatty acid salt homogenate was prepared by homogenizing 209 g of the pre-formed soap, prepared above, in solvent and Butvat™ B-79 poly(vinyl butyral) according to the following procedure.
1. Add 209 g of pre-formed soap to 780 g of 2-butanone, and 11 g of Butvar™ B-79.
2. Mix the dispersion for 10 minutes and hold overnight at 45° F.
3. Homogenize at 6000 psi.
4. Homogenize again at 6000 psi.

Preparation of Photothermographic Elements: 507 g of pre-formed soap homogenate was stirred for 15 minutes at 55° F. and 3.9 mL of a pyridinium hydrobromide ;perbromide (PHP) solution (prepared by dissolving 1.35 g of PHP in 12 g of methanol) was added. Stirring for 2 hours was followed by addition of 5.2 mL of a calcium bromide solution (prepared by dissolving 1.0 g of CaBr$_2$ in 8.00 g of methanol). Stirring was maintained for 30 minutes after which 117 g of Butvar™ B-79 poly(vinyl butyral) was added. After stirring for an additional 30 minutes, 27.3 g of Permanax™ WSO was added, and the dispersion allowed to stir for another 15 minutes. Then 2.73 g of antifoggant AF-1 was added followed by 15 minutes of stirring. This was followed by addition of 1.39 g of THDI in 12.3 g of 2-butanone and the dispersion stirred for an additional 15 minutes followed by heating at 70° F. for 15 minutes.

From this dispersion, 100 g was taken for each test sample. To each of these samples was added a solution containing;
a) 0.0061 to 0.010 g of sensitizing dye for the 1 molar test level (herein referred to as 1X) or 0.0008 to 0.001 g of sensitizing dye for the 1/10 molar test level (herein referred to as 1/10X). The amounts varied so as to maintain equivalent mole levels among the various dyes;
b) 0.47 g of CBBA; and
c) 0.043 g of MMBI in 2.6 g of methanol.

The sample was then allowed to mix for 1.0 hr at 70° F. before adding 0.368 g of PHZ and 0.123 g of TCPA together with mixing for an additional 15 minutes before coating.

A topcoat solution was prepared by mixing the following materials at room temperature:

| Material | Amount |
|---|---|
| 2-butanone | 512.0 g |
| methanol | 61.0 g |
| CAB 171-15S | 48.0 g |
| 4-MPA | 2.08 g |
| FT-A as a 16% solids solution in 2-butanone | 3.3 g |
| Acryloid A-21 resin | 1.9 g |
| Vinyl Sulfone-1 (VS-1) | 0.5 g |

The samples were then coated out under infrared safelights. The photothermographic emulsion and topcoat formulations were coated onto a 7 mil (176 μm) blue tinted polyethylene terephthalate support provided with an antihalation back coating containing AH Dye-1 in CAB 381-20 resin. A dual-knife coater was used. This apparatus consists of two knife coating blades in series. The support was cut to a length suitable to the volume of solution used, and after raising the hinged knives, placed in position on the coater bed. The knives were then lowered and locked into place. The height of the knives was adjusted with wedges controlled by screw knobs and measured with electronic gauges. Knife #1 was raised to a clearance corresponding to the thickness of the support plus the desired wet thickness of the emulsion layer (layer #1). Knife #2 was raised to a height equal to the desired thickness of the support plus the desired wet thickness the emulsion layer (layer #1) plus the desired wet thickness of the topcoat layer (layer #2).

The photothermographic emulsion layer was coated at a wet thickness of 3.7 mil (94 μm) above the support. The topcoat was coated over the photothermographic emulsion layer at a wet thickness of 5.3 mil (135 μm) above the support. The photothermographic element was dried for four minutes at 175° F. (79.4° C.).

Sensitometric and Thermal Stability Measurements: The coated and dried photothermographic elements were cut into 1.5 inch by 8 inch strips (3.8 cm×20.3 cm) and exposed with a laser sensitometer incorporating a 809 nm, 150 mW laser diode. After exposure, the film strips were processed by heating at 255° F. (124° C.) for 15 seconds to give an image.

The images obtained were then evaluated on a custom-built, computer-scanned densitometer and are believed to be comparable to measurements obtainable from commercially available densitometers. Sensitometric results include Dmin, D-hi, Speed-2, Speed-3, Average Contrast-1, Average Contrast-3, and Dmax.

Dmin is the density of the non-exposed areas after development. It is the average of eight lowest density values on the exposed side of the fiducial mark.

Dhi is the density value corresponding to an exposure at 1.40 Log E greater than the exposure corresponding to 0.20 above Dmin. E is the exposure in ergs/cm$^2$.

Speed-2 is the Log 1/E+4 needed to achieve a density of 1.00 above Dmin. E is the exposure in ergs/cm$^2$.

Speed-3 is the Log 1/E+4 needed to achieve a density of 2.90 above Dmin. E is the exposure in ergs/cm$^2$. Speed-3 is important in evaluating the exposure response of a photothermographic element to high intensity light sources.

AC-1 (Average Contrast 1) is the slope of the line joining the density points 0.60 and 2.00 above Dmin.

AC-3 (Average Contrast 3) is the slope of the line joining the density points 2.40 and 2.90 above Dmin.

Dmax is the highest density value on the exposed side of the fiducial mark.

EXAMPLE 1

Example 1 compares Dye-2 with Dye-C-4 and demonstrates that photothermographic emulsions containing sensitizing dyes incorporating a thiomethyl group ($CH_3S$—) on the benzothiazole ring affords photothermographic elements having higher speed, higher contrast, and lower Dmin than a similar dye lacking a thiomethyl group ($CH_3S$—) on the benzothiazole ring. Dye-2 represents a dye of this invention. Dye C-4 represents a comparative dye. Δ represents the improvement of the dye of this invention over the comparative dye (C-4).

| Level | Compound | Dmin | Dhi | Speed-2 | Speed-3 | AC-1 | AC-3 |
|---|---|---|---|---|---|---|---|
| 1X | Dye-C-4 | 0.252 | — | 1.27 | 0.75 | 4.73 | 2.14 |
| 1X | Dye-2 | 0.229 | — | 1.46 | 1.07 | 5.37 | 3.19 |
| Δ | | −0.023 | | 0.19 | 0.32 | 0.64 | 1.05 |

EXAMPLE 2

Example 2 compares Dye-1 and Dye-4 with Dye-C-2 and demonstrates that photothermographic emulsions containing sensitizing dyes incorporating both a thiomethyl group ($CH_3S$—) on the benzothiazole ring and having a rigidized chain affords photothermographic elements having higher speed, higher contrast, and lower Dmin than a similar dye having a rigidized chain but lacking a thiomethyl group ($CH_3S$—) on the benzothiazole ring. Dye-1 and Dye-4 represent dyes of this invention. Dye C-2 represents a comparative dye. Δ represents the improvement of the respective dye of this invention over the comparative dye (C-2).

| Level | Compound | Dmin | Dhi | Speed-2 | Speed-3 | AC-1 | AC-3 |
|---|---|---|---|---|---|---|---|
| 1X | Dye-C-2 | 6.274 | — | 1.39 | 0.86 | 4.33 | 2.41 |
| 1X | Dye-1 | 0.247 | — | 1.96 | 1.57 | 6.11 | 3.00 |
| Δ | | −0.027 | | 0.57 | 0.71 | 1.78 | 0.59 |
| 1X | Dye-4 | 0.231 | 3.69 | 1.89 | 1.37 | 5.58 | 2.22* |

*worse value than the comparison dye.

EXAMPLE 3

Example 3 compares Dye-1 with Dye-C-3 and demonstrates that photothermographic emulsions containing sensitizing dyes incorporating both a thiomethyl group ($CH_3S$—) on the benzothiazole ring and having a rigidized chain affords photothermographic elements having higher speed, higher contrast, and lower Dmin than a similar dye having a rigidized chain and an alkylcarboxy group, but lacking a thiomethyl group ($CH_3S$—) on the benzothiazole ring. Dye-1 represents a dye of this invention. Dye-C-3 represents a comparative dye. Δ represents the improvement of the dye of this invention over the comparative dye.

| Level | Compound | Dmin | Dhi | Speed-2 | Speed-3 | AC-1 | AC-3 |
|---|---|---|---|---|---|---|---|
| 1X | Dye-C-3 | 0.275 | 3.58 | 1.83 | 1.20 | 4.41 | 1.74 |
| 1X | Dye-1 | 0.247 | 3.65 | 2.02 | 1.52 | 5.80 | 2.14 |
| Δ | | −0.028 | | 0.19 | 0.32 | 1.39 | 0.40 |

EXAMPLES 4–5

Examples 4 and 5 again compare Dye-1 with Dye-C-3 and demonstrate that photothermographic emulsions containing sensitizing dyes incorporating both a thiomethyl group ($CH_3S$—) on the benzothiazole ring and having a rigidized chain affords photothermographic elements having higher speed, higher contrast (AC-1 only), and lower Dmin even when used at 1/10 the molar level (1/10 X) when compared to a similar dye having a rigidized chain and an alkylcarboxy group, but lacking a thiomethyl group ($CH_3S$—) on the benzothiazole ring. Dye-1 represents a dye of this invention. Dye C-3 represents a comparative dye.

| Level | Compound | Dmin | Dhi | Speed-2 | Speed-3 | AC-1 | AC-3 |
|---|---|---|---|---|---|---|---|
| Example 4 ||||||||
| 1X | Dye-C-3 | 0.256 | 3.61 | 1.89 | 1.29 | 4.63 | 1.98 |
| 1X | Dye-1 | 0.241 | 3.75 | 2.10 | 1.62 | 5.67 | 2.41 |
| 1/10X | Dye-1 | 0.235 | 3.51 | 2.05 | 1.45 | 5.56 | 1.74 |
| Example 5 ||||||||
| 1/10X | Dye-C-3 | 0.233 | — | 1.55 | 1.01 | 4.57 | 2.24 |
| 1X | Dye-C-3 | 0.260 | 3.63 | 1.85 | 1.30 | 4.92 | 2.14 |
| 1/10X | Dye-1 | 0.228 | 3.85 | 1.98 | 1.56 | 6.17 | 3.03 |

EXAMPLE 6

Example 6 compares Dye-3 with Dye-C-3 and again demonstrates that photothermographic emulsions containing sensitizing dyes incorporating two thiomethyl groups ($CH_3S$—) on each benzothiazole ring and having a rigidized chain affords photothermographic elements having higher speed, higher contrast, and lower Dmin than a similar dye having a rigidized chain and an alkylcarboxy group, but lacking a thiomethyl group ($CH_3S$—) on the benzothiazole ring. Dye-3 represents a dye of this invention. Dye-C-3 represents a comparative dye. Δ represents the improvement of the dye of this invention over the comparative dye.

| Level | Compound | Dmin | Dhi | Speed-2 | Speed-3 | AC-1 | AC-3 |
|---|---|---|---|---|---|---|---|
| 1X | Dye-C-3 | 0.275 | 3.58 | 1.83 | 1.20 | 4.41 | 1.74 |
| 1X | Dye-3 | 0.261 | 3.60 | 1.89 | 1.35 | 5.28 | 2.03 |
| Δ | | −0.014 | | 0.06 | 0.15 | 0.87 | 0.29 |

EXAMPLE 7

Example 7 compares Dye-1 with Dye-C-3 and demonstrates that photothermographic emulsions containing sensitizing dyes incorporating thiomethyl groups ($CH_3S$—) on each benzothiazole ring and having a rigidized chain affords photothermographic elements having longer storage stability (pot life) compared to a similar dye having a rigidized chain and an alkylcarboxy group, but lacking a thiomethyl group ($CH_3S$—) on the benzothiazole ring. Again higher speed, higher contrast, and lower Dmin was obtained incorporating the dyes of this invention. Dye-1 represents a dye of this invention. Dye-C-3 represents a comparative dye. Δ represents the change in properties for the dye of this invention and the comparative dye (C-3).

| Level | Compound | Conditions | Dmin | Dhi | Speed-2 | Speed-3 | AC-1 | AC-3 |
|---|---|---|---|---|---|---|---|---|
| 1X | Dye-C-3 | initial sensitometry | 0.238 | 3.45 | 1.73 | 1.13 | 4.00 | 1.79 |
| 1X | Dye-C-3 | 25 hr pot life at 55° F. | 0.292 | 3.61 | 1.75 | 1.21 | 4.53 | 2.01 |
| Δ | | | 0.054 | | 0.02 | 0.08 | 0.53 | 0.22 |
| 1X | Dye-1 | initial sensitometry | 0.230 | 3.67 | 1.94 | 1.50 | 5.13 | 2.77 |
| 1X | Dye-1 | 25 hr pot life at 55° F. | 0.244 | 3.88 | 1.98 | 1.62 | 5.51 | 3.93 |
| Δ | | | 0.014 | | 0.04 | 0.12 | 0.38 | 1.16 |

EXAMPLE 8

Example 8 again compares Dye-1 with Dye-C-3 and demonstrates that photothermographic emulsions containing sensitizing dyes incorporating thiomethyl groups ($CH_3S$—) on each benzothiazole ring and having a rigidized chain affords photothermographic elements capable of sustaining hotter drying conditions compared to a similar dye having a rigidized chain and an alkylcarboxy group, but lacking a thiomethyl group ($CH_3S$—) on the benzothiazole ring. Again higher speed, higher contrast, and lower Dmin was obtained incorporating the dyes of this invention. Dye-1 represents a dye of this invention. Dye-C-3 represents a comparative dye. Δ represents the change in properties for the dye of this invention and the comparative dye (C-3).

| Level | Compound | Conditions | Dmin | Dhi | Speed-2 | Speed-3 | AC-1 | AC-3 |
|---|---|---|---|---|---|---|---|---|
| 1X | Dye-C-3 | 175° F./4 min drying - std | 0.227 | 3.68 | 1.81 | 1.30 | 5.18 | 2.12 |
| 1X | Dye-C-3 | 205° F./4 min drying | 0.220 | — | 1.43 | — | 2.82 | — |
| Δ | | | −0.007 | | −0.38 | | −2.36 | |
| 1/10X | Dye-1 | 175° F./4 min drying - std | 0.212 | 3.85 | 1.86 | 1.54 | 5.63 | 5.14 |
| 1/10X | Dye-1 | 205° F./4 min drying | 0.209 | — | 1.63 | 1.05 | 4.18 | 1.94 |
| Δ | | | −0.003 | | −0.23 | −0.49 | −1.45 | −3.20 |

EXAMPLE 9

Example 9 provides an additional comparison between thioalkyl and alkoxy substitution on the benzothiazole ring and further demonstrates the unique advantages provided by thioalkyl substitution. It also demonstrates the additional improvement provided by incorporation of a supersensitizer along with the dyes containing a thioalkyl group into the photothermographic element.

Photothermographic elements were prepared, coated, and dried as described earlier. Four dyes were compared.

Samples 9-1 to 9-10 were prepared for comparison.

Sample 9-1 contains Dye C-3 at the 1X level along with 5-methyl-2-mercaptobenzimidazole as a supersensitizer.

Sample 9-2 contains Dye 1 at the 1X level along with 5-methyl-2-mercaptobenzimidazole as a supersensitizer.

Sample 9-3 contains Dye 1 at the 1/10 X level along with 5-methyl-2-mercaptobenzimidazole as a supersensitizer.

Sample 9-4 contains Dye C-2 at the 1X level along with 5-methyl-2-mercaptobenzimidazole as a supersensitizer.

Sample 9-5 contains Dye C-2 at the 1/10X level along with 5-methyl-2-mercaptobenzimidazole as a supersensitizer.

Sample 9-6 contains Dye C-1 at the 1X level along with 5-methyl-2-mercaptobenzimidazole as a supersensitizer.

Sample 9-7 contains Dye 1 at the 1/10X level along with 5-methyl-2-mercaptobenzimidazole as a supersensitizer.

Sample 9-8 contains Dye 1 at the 1X level with no supersensitizer.

Sample 9-9 contains Dye C-2 at the 1X level with no supersensitizer.

Sample 9-10 contains Dye C-1 at the 1X level with no supersensitizer.

The data, shown below, demonstrates the that lower amounts of dyes of this invention (1/10X) work well when compared to larger amounts of dyes of an analogous structure but lacking the thioalkyl groups.

Samples 9-9, and 9-10 demonstrate that under the imaging and processing conditions described above, dyes not incorporating a thioalkyl group on the benzothiazole ring provide photothermographic elements with photospeeds too slow to measure, even with the 150 mW laser diode used in the examples.

| Sample | Dye | Dmin | Dhi | Speed-2 | Speed-3 | AC-1 | AC-3 | Dmax |
|---|---|---|---|---|---|---|---|---|
| 9-1 | Dye-C-3 1X | 0.245 | 3.91 | 1.76 | 1.28 | 4.88 | 2.80 | 3.97 |
| 9-2 | Dye 1 1X | 0.240 | 3.39 | 1.92 | 1.53 | 6.01 | 3.04 | 4.02 |
| 9-3 | Dye-1 1/10X | 0.221 | 3.91 | 1.84 | 1.43 | 5.49 | 3.04 | 3.97 |
| 9-4 | Dye-C-2 1X | 0.242 | * | 1.06 | * | 4.42 | * | 2.95 |
| 9-5 | Dye-C-2 1/10X | 0.225 | * | 0.84 | * | * | * | 1.96 |
| 9-6 | Dye-C-1 1X | 0.247 | * | 1.34 | 0.79 | 4.20 | 2.16 | 3.35 |
| 9-7 | Dye-C-1 1/10X | 0.230 | * | 1.19 | * | 4.08 | * | 3.15 |
| 9-8 | Dye-1 1X | 0.233 | * | 1.39 | 0.87 | 4.97 | 2.22 | 3.49 |
| 9-9 | C-2 1X | @ | @ | @ | @ | @ | @ | @ |
| 9-10 | C-1 1X | @ | @ | @ | @ | @ | @ | @ |

*Value too low to measure. @Photospeed too slow to measure.

Reasonable modifications and variations are possible from the foregoing disclosure without departing from either the spirit or scope of the present invention as defined by the claims.

What we claim is:

1. A heat developable, photothermographic element comprising a support bearing at least one photosensitive, image-forming layer comprising:

(a) a photosensitive silver halide;
   (b) a non-photosensitive, reducible silver source;
   (c) a reducing agent for silver ions;
   (d) a binder; and
   (e) a spectrally sensitizing amount of a compound having the central nucleus:

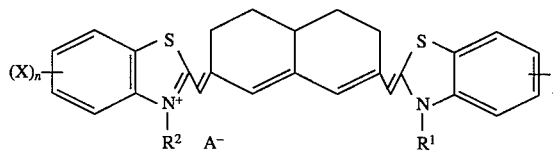

wherein:

X is independently a thioalkyl group of from 1 to 20 carbon atoms;

n is independently 0, 1 or 2 with the total of all n's being at least 1;

$R^1$ and $R^2$ represent an alkyl group of from 1 to 20 carbon atoms other than carboxy-substituted alkyl; and $A^-$ is an anion.

2. The photothermographic element according to claim 1 wherein the silver halide is silver bromide, silver chloride, silver iodide, silver chlorobromide, silver bromoiodide, silver chlorobromoiodide, or mixtures thereof.

3. The photothermographic element of claim 1 wherein reducible silver source comprises a silver salt of a fatty acid.

4. The photothermographic element according to claim 3 wherein said non-photosensitive, reducible source of silver comprises a silver salt of a $C_1$ to $C_{30}$ carboxylic acid.

5. The photothermographic element according to claim 4 wherein said non-photosensitive silver source comprises silver behenate.

6. The photothermographic element of claim 1 wherein said binder is a hydrophobic polymeric binder.

7. The photothermographic element of claim 6 wherein said binder is selected from the group consisting of polyvinylbutyral, cellulose acetate butyrate, cellulose acetate proprionate, and vinyl resins.

8. The photothermographic element of claim 1 wherein said binder is hydrophobic and each n is 1 or 2.

9. The photothermographic element according to claim 1 wherein said reducing agent is a hindered phenol.

10. The photothermographic element of claim 9 wherein said hindered phenol is selected from the group consisting of binaphthols, biphenols, bis(hydroxynaphthyl)methanes, bis(hydroxyphenyl)methanes, hindered phenols, and naphthols.

11. The photothermographic element of claim 10 wherein said hindered phenol is a bis(hydroxyphenyl)methane.

12. The photothermographic element of claim 1 wherein groups $R^1$ and $R^2$ have from 1 to 8 carbon atoms.

13. The photothermographic element of claim 12 wherein $R^1$ and $R^2$ represent ethyl groups.

14. The photothermographic element of claim 1 wherein each X substituent independently comprises a thioalkyl group of 1 to 20 carbon atoms and each n is 1 or 2.

15. The photothermographic element of claim 1 wherein the concentration of said spectrally sensitizing compound is in the range $2 \times 10^{-8}$ to $4 \times 10^{-2}$ moles of dye per mole of silver in said emulsion layer.

16. The photothermographic element of claim 15 wherein the concentration of said spectrally sensitizing compound is in the range $2\times10^{-5}$ to $8\times10^{-4}$ moles of dye per mole of silver in said emulsion layer.

17. The photothermographic element of claim 1 wherein said image forming layer comprises two or more sublayers.

18. The photothermographic element of claim 1 having a supersensitizer in said image forming layer.

19. The photothermographic element of claim 1 wherein said supersensitizer is selected from the group consisting of is an aromatic, heterocyclic mercapto or disulfide compound, mercapto-substituted benzimidazole, mercapto-substituted benzoxazoles, and mercapto-substituted benzothiazoles.

20. The photothermographic element of claim 19 wherein said supersensitizer is selected from the group consisting of 5-methyl-2-mercaptobenzimidazole, 2-mercaptobenzimidazole, 2-mercaptobenzoxazole, 2-mercaptobenzothiazole, and 2-mercapto-5-methylbenzimidazole.

21. The photothermographic element of claim 20 wherein each n is 1 or 2.

22. A heat developable, photothermographic element comprising a support bearing at least one photosensitive, image-forming layer comprising:

(a) a photosensitive silver halide;

(b) a non-photosensitive, reducible silver source;

(c) a reducing agent for silver ions;

(d) a binder; and (e) a spectrally sensitizing amount of a compound having the central nucleus:

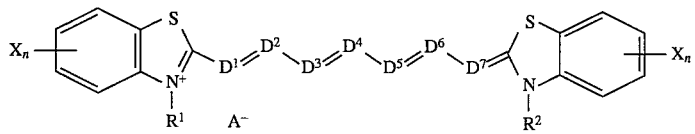

wherein:

X is independently a thioalkyl group of from 1 to 20 carbon atoms;

$D^1$ to $D^7$ each independently represents a methine group and adjacent methine groups selected from $D^2$, $D^3$, $D^4$, $D^5$ and $D^6$ may form cyclic groups;

n is independently 0, 1 or 2 with the total of all n's being at least 1;

$R^1$ and $R^2$ represent an alkyl group of from 1 to 20 carbon atoms other than carboxy-substituted alkyl; and $A^-$ is an anion.

23. The element of claim 22 wherein at least two adjacent methine groups selected from $D^2$, $D^3$, $D^4$, $D^5$ and $D^6$ form a carbocyclic ring structure.

24. The element of claim 22 wherein said carbocyclic ring structure comprises a tetrahydronaphthyl group.

25. The element of claim 24 wherein said compound is a dye of one of the following formulae:

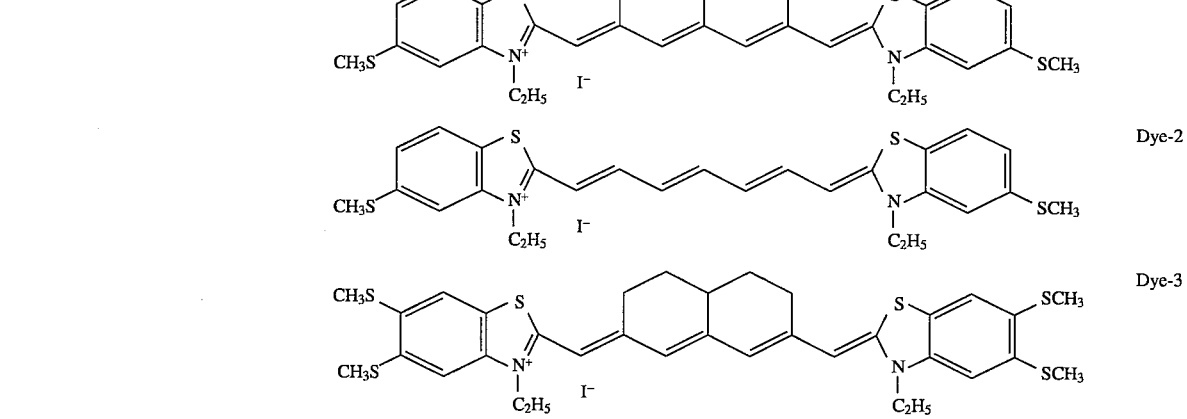

-continued

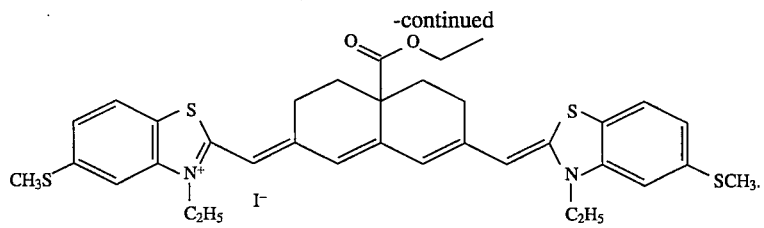

Dye-4

26. The photothermographic element of claim 23 having a supersensitizer in the image forming layer.

27. The photothermographic element of claim 27 wherein said supersensitizer is an aromatic, heterocyclic mercapto or disulfide compound.

28. The photothermographic element of claim 26 wherein said supersensitizer is selected from the group consisting of mercapto-substituted benzimidazoles, benzoxazoles, and benzothiazoles.

29. The photothermographic element of claim 26 wherein said supersensitizer is selected from the group consisting of 5-methyl-2-mercaptobenzimidazole, 2-mercaptobenzimidazole, 2-mercaptobenzoxazole, 2-mercaptobenzothiazole, and 2-mercapto-5-methylbenzimidazole.

30. The photothemmgraphic element of claim 26 wherein each n is 1 or 2.

31. A heat developable, photothermographic element comprising a support bearing at least one photosensitive, image-forming layer comprising:

(a) a photosensitive silver halide;

(b) a non-photosensitive, reducible silver source;

(c) a reducing agent for silver ions;

(d) a binder; and (e) a spectrally sensitizing amount of a compound having the central nucleus:

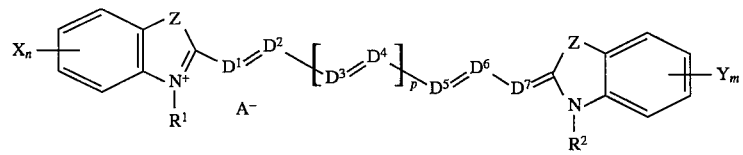

wherein:

Z is S, O, Se or N—$R^3$;

$R^1$ and $R^2$ represent an alkyl group of from 1 to 20 carbon atoms other than carboxysubstituted alkyl;

$R^3$ is H or alkyl group;

X and Y are thioalkyl groups of from 1 to 20 carbon atoms;

n=0 to 4;

m=0 to 4;

the sum of m plus n is at least 1;

$D^1$ to $D^7$ each independently represents a methine group and adjacent methine groups selected from $D^2$, $D^3$, $D^4$, $D^5$ and $D^6$ may form cyclic groups;

p=0 or 1; and $A^-$ is an anion.

32. The photothermographic element of claim 31 having a supersensitizer in said imaging layer.

33. The photothermographic element of claim 32 wherein said supersensitizer is an aromatic, heterocyclic mercapto or disulfide compound.

34. The photothermographic element of claim 32 wherein said supersensitizer is selected from the group consisting of mercapto-substituted benzimidazoles, benzoxazoles, and benzothiazoles.

35. The photothermographic element of claim 32 wherein said supersensitizer is selected from the group consisting of 5-methyl-2-mercaptobenzimidazole, 2-mercaptobenzimidazole, 2-mercaptobenzoxazole, 2-mercaptobenzothiazole, and 2-mercapto-5-methylbenzimidazole.

36. The photothermographic element of claim 32 wherein both m and n are 1 or 2.

* * * * *

REEXAMINATION CERTIFICATE (3671st)

United States Patent [19]

Miller et al.

[11] B1 5,541,054
[45] Certificate Issued Nov. 17, 1998

[54] SPECTRAL SENSITIZING DYES FOR PHOTOTHERMOGRAPHIC ELEMENTS

[75] Inventors: James R. Miller, Hudson, Wis.; Brian C. Willett, Grant Township, Washington County, Minn.; Doreen C. Lynch, Afton, Minn.; Becky J. Kummeth, Lake Elmo, Minn.

[73] Assignee: Imation Corp., Saint Paul, Minn.

Reexamination Request:
No. 90/004,636, May 15, 1997

Reexamination Certificate for:
Patent No.: 5,541,054
Issued: Jul. 30, 1996
Appl. No.: 425,860
Filed: Apr. 20, 1995

[51] Int. Cl.$^6$ .................. G03C 1/498; G03C 1/20
[52] U.S. Cl. .................. 430/572; 430/584; 430/603; 430/611; 430/617; 430/619
[58] Field of Search .................. 430/572, 584, 430/603, 617, 611, 619

[56] References Cited

U.S. PATENT DOCUMENTS

| | | |
|---|---|---|
| 2,734,900 | 2/1956 | Heseltine . |
| 4,975,362 | 12/1990 | Parton et al. .................. 430/584 |
| 5,108,882 | 4/1992 | Parton et al. .................. 430/502 |
| 5,387,502 | 2/1995 | Inagaki .................. 430/584 |
| 5,393,654 | 2/1995 | Burrows et al. .................. 430/584 |

FOREIGN PATENT DOCUMENTS

| | | |
|---|---|---|
| 530827 | 3/1993 | European Pat. Off. . |
| 0559228 | 8/1993 | European Pat. Off. . |
| 06003763A | 1/1994 | Japan . |

OTHER PUBLICATIONS

"Redox Limitations for the Spectral sensitization of Silver Halide in the infrared" by J.R. Lenhard, et al., J. Phys. Chem., 1993, 97, pp. 8269–8280.

"Cyanine Type Dyes," disclosed by Wayne W. Weber, II, Research Disclosure, Sep., 1978 Item No. 17363, p. 64, including Process of Formation of Color Images, Photographic Product and Treatment.

Solution Useful for Putting the Process into Practice, Research Disclosure, Sep., 1978, Item No. 17362, p. 66.

*Primary Examiner*—Thorl Chea

[57] ABSTRACT

The present invention provides heat-developable, photothermographic elements comprising a support bearing at least one photosensitive, image-forming layer comprising:
(a) a photosensitive silver halide;
(b) a non-photosensitive, reducible silver source;
(c) a reducing agent for silver ions;
(d) a binder; and
(e) a spectrally sensitizing amount of a compound having the central nucleus:

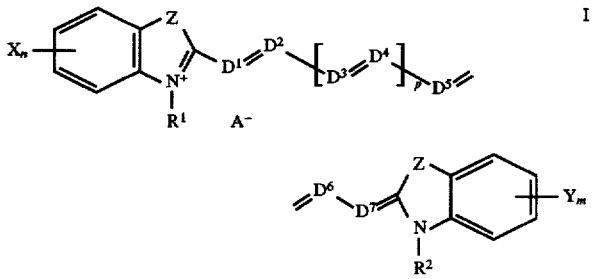

wherein:

Z is S, O, Se or N—$R^3$;

$R^1$ and $R^2$ represent an alkyl group of from 1 to 20 carbon atoms other than carboxy-substituted alkyl, preferably an alkyl group of from 1 to 8 carbon atoms, and most preferably an ethyl group; and $R^3$ is H or alkyl group;

X and Y are thioalkyl groups of from 1 to 20 carbon atoms;

n=0 to 4;

m=0 to 4; the sum of n plus m equals at least 1;

$D^1$ to $D^7$ each independently represents a methine group and adjacent methine groups selected from $D^2$, $D^3$, $D^4$, $D^5$ and $D^6$ may form cyclic groups;

p=0 or 1; and $A^-$ is an anion.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–30 is confirmed.

Claim 31 is determined to be patentable as amended.

Claims 32–36, dependent on an amended claim, are determined to be patentable.

31. A heat developable, photothermographic element comprising a support bearing at least one photosensitive, image-forming layer comprising:
(a) a photosensitive silver halide;
(b) a non-photosensitive, reducible silver source;
(c) a reducing agent for silver ions;
(d) a binder; and
(e) a spectrally sensitizing amount of a compound having the central nucleus:

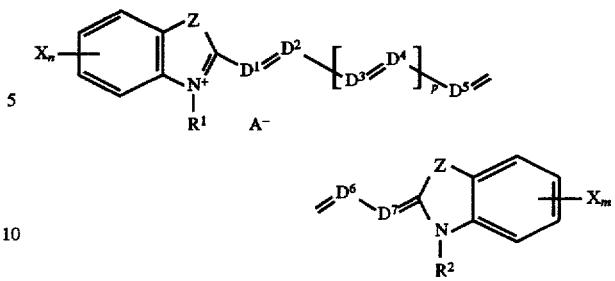

wherein:

Z is S[, O, Se or N-$R^3$];

$R^1$ and $R^2$ represent an alkyl group of from 1 to 20 carbon atoms other than carboxysubstituted alkyl;

$R^3$ is H or alkyl group;

X and Y are thioalkyl groups of from 1 to 20 carbon atoms;

n=0 to 4;

m=0 to 4;

the sum of m plus n is at least 1;

$D^1$ to $D^7$ each independently represents a methine group and adjacent methine groups selected from $D^2$, $D^3$, $D^4$, $D^5$ and $D^6$ may form cyclic groups;

p=0 or 1; and $A^-$ is an anion.

* * * * *